US012631782B1

(12) United States Patent  
Clegg et al.

(10) Patent No.: US 12,631,782 B1  
(45) Date of Patent: May 19, 2026

(54) ENHANCED LOOK AHEAD PREDICTION

(71) Applicant: Halliburton Energy Services, Inc., Houston, TX (US)

(72) Inventors: Nigel Mark Clegg, Great Yarmouth (GB); Jin Ma, Houston, TX (US); Hsu Hsiang Wu, Houston, TX (US); Alban Gerard Duriez, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 19/039,466

(22) Filed: Jan. 28, 2025

(51) Int. Cl.
| | |
|---|---|
| *G01V 3/28* | (2006.01) |
| *E21B 7/04* | (2006.01) |
| *E21B 44/00* | (2006.01) |

(52) U.S. Cl.
CPC ................. *G01V 3/28* (2013.01); *E21B 7/04* (2013.01); *E21B 44/00* (2013.01)

(58) Field of Classification Search
CPC .............. G01V 3/28; E21B 7/04; E21B 44/00
See application file for complete search history.

(56) References Cited

U.S. PATENT DOCUMENTS

| | | |
|---|---|---|
| 10,962,676 B2 | 3/2021 | Ma et al. |
| 10,996,368 B2 | 5/2021 | Dong et al. |
| 11,008,836 B2 | 5/2021 | Wu et al. |
| 11,029,440 B2 | 6/2021 | Wu et al. |
| 11,143,023 B2 | 10/2021 | Ma et al. |
| 11,299,978 B2 | 4/2022 | Song et al. |

| | | |
|---|---|---|
| 11,320,560 B2 | 5/2022 | Wilson et al. |
| 11,339,650 B2 | 5/2022 | Bittar et al. |
| 11,391,859 B2 | 7/2022 | Pan et al. |
| 11,402,533 B2 | 8/2022 | Wu et al. |
| 11,434,750 B2 | 9/2022 | Wu et al. |
| 11,448,795 B2 | 9/2022 | Ma |
| 11,459,868 B2 | 10/2022 | Fan et al. |

(Continued)

OTHER PUBLICATIONS

Halliburton, iStar Platform, EarthStar ZX Near-bit, Shallow and Ultra-Deep Resistivity Service, H014486, Jun. 2023.

(Continued)

*Primary Examiner* — Dany E Akakpo
(74) *Attorney, Agent, or Firm* — Benjamin Ford; C. Tumey Law Group PLLC

(57) ABSTRACT

A non-transitory machine-readable medium having data stored therein representing a software executable by a computer. The software executable comprising instructions configured to receive a first data set of one or more electromagnetic measurements at a first location in a borehole from a logging tool, receive a second data set of one or more electromagnetic measurements at a second location in the borehole from the logging tool, and perform a first inversion on the first data set of one or more electromagnetic measurements to form a first inverted data set. The software executable further configured to perform a second inversion on the second data set of one or more electromagnetic measurements to form a second inverted data set, compare the first inverted data set to the second inverted data set to identify a gradient change between each of the one or more electromagnetic measurements in the first inverted data set and the second inverted data set, and alter course of rotary steerable system (RSS) based at least in part on the gradient change.

16 Claims, 10 Drawing Sheets

(56) References Cited

U.S. PATENT DOCUMENTS

| | | |
|---|---|---|
| 11,459,870 B2 | 10/2022 | Ma et al. |
| 11,467,312 B2 | 10/2022 | Pan et al. |
| 11,520,071 B2 | 12/2022 | Wu et al. |
| 11,543,552 B2 | 1/2023 | Wu et al. |
| 11,674,378 B2 | 6/2023 | Bittar et al. |
| 11,703,610 B2 | 7/2023 | Ma |
| 11,874,424 B2 | 1/2024 | Pan et al. |
| 11,885,925 B2 | 1/2024 | Ma et al. |
| 11,898,435 B2 | 2/2024 | Pan et al. |
| 12,044,819 B2 | 7/2024 | Ma et al. |
| 12,091,964 B2 | 9/2024 | Clegg et al. |
| 12,146,403 B2 | 11/2024 | Clegg et al. |
| 2009/0012710 A1 | 1/2009 | Van Os et al. |
| 2015/0088426 A1* | 3/2015 | Tang ..................... G01V 3/20 |
| | | 702/7 |
| 2018/0258751 A1* | 9/2018 | Tchakarov ............. E21B 47/09 |
| 2019/0064383 A1 | 2/2019 | Song et al. |
| 2019/0113439 A1* | 4/2019 | San Martin .......... E21B 47/006 |
| 2020/0240261 A1 | 7/2020 | Wu et al. |
| 2020/0300084 A1 | 9/2020 | Bittar et al. |
| 2020/0378247 A1 | 12/2020 | Ma et al. |
| 2021/0055447 A1 | 2/2021 | Dong et al. |
| 2021/0095525 A1 | 4/2021 | DePavia et al. |
| 2021/0190987 A1 | 6/2021 | Wu et al. |
| 2021/0208302 A1 | 7/2021 | Ma et al. |
| 2021/0239873 A1* | 8/2021 | Djefel ..................... G01V 3/38 |
| 2021/0285297 A1 | 9/2021 | Larsen et al. |
| 2021/0356621 A1 | 11/2021 | Wu et al. |
| 2021/0363870 A1 | 11/2021 | Fan et al. |
| 2021/0405240 A1 | 12/2021 | Ma |
| 2022/0397695 A1 | 12/2022 | Ma et al. |
| 2022/0404520 A1 | 12/2022 | Ma et al. |
| 2022/0413179 A1 | 12/2022 | Ma |
| 2023/0313672 A1 | 10/2023 | Clegg et al. |
| 2024/0019599 A1 | 1/2024 | Primiero |
| 2024/0219600 A1 | 7/2024 | Wu et al. |

OTHER PUBLICATIONS

International Search Report and Written Opinion for International Patent Application No. PCT/US2025/018323 dated Oct. 21, 2025. PDF file. 9 pages.

* cited by examiner

*900*

902 — DISPOSE ROTARY STEERABLE SYSTEM INTO FORMATION

904 — ESTABLISH BACKGROUND EM FIELD

906 — ESTABLISH ANY NOISE IN THE SIGNAL

908 — RUN A CONTINUOUS EM INVERSION

910 — IDENTIFY CHANGES TO BACKGROUND EM FIELD

912 — PREDICT SIGNAL FROM CHANGES

914 — ALTER COURSE OF ROTARY STEERABLE SYSTEM

916

*1000*

*1004*

1002 — YY
1002 — ZZ
1002 — ZX
1002 — XX

ENHANCED LOOK AHEAD PREDICTION

BACKGROUND

Modern petroleum drilling and production operations may demand a great quantity of information relating to the parameters and conditions downhole. Such information typically includes the location and orientation of the borehole and drilling assembly, earth formation properties, and parameters of the downhole drilling environment. The collection of information relating to formation properties and downhole conditions is commonly referred to as logging and can be performed during the drilling process itself (hence the term "logging while drilling" or "LWD," frequently used interchangeably with the term "measurement while drilling" or "MWD").

When plotted as a function of depth or tool position in the borehole, the logging tool measurements are termed "logs." Resistivity logging may be used in well logging to determine geological correlation of formation strata and detect and quantify potentially productive formation zones. Such logs may provide indications of hydrocarbon concentrations and other information useful to drillers and completion engineers. In particular, azimuthally-sensitive logs may provide information useful for steering the drilling assembly because they can inform the driller when a target formation bed has been entered or exited, thereby enabling modifications to the drilling program that will provide much more value and higher success than would be the case using only seismic data.

During drilling operations used for the exploration of hydrocarbons, it may be desirable to identify what the small changes in resistivity ahead mean in terms of changes in fluids or formations. An EM transmission sequence takes time. As a well is being drilled, the tool will get closer to a formation or fluid change in the formation may be responsible for an identified change in the EM field. Increased proximity to the change may improve the strength of the signal that is contributed by that feature, however that means the borehole is closer to a feature and that may be detrimental to the borehole, or potentially even hazardous, for example approaching a waterfront or fault. To enable improved detection of changes in resistivity ahead, without increasing the proximity to the feature that is causing the resistivity change, a process that enhances the quality of the EM data measured needs to be implemented to enable improved detection of the changes ahead when stationary or drilling ahead slowly.

BRIEF DESCRIPTION OF THE DRAWINGS

The features and advantages of certain embodiments will be more readily appreciated when considered in conjunction with the accompanying figures. The figures are not to be construed as limiting any of the preferred embodiments.

DETAILED DESCRIPTION

Figure 1:
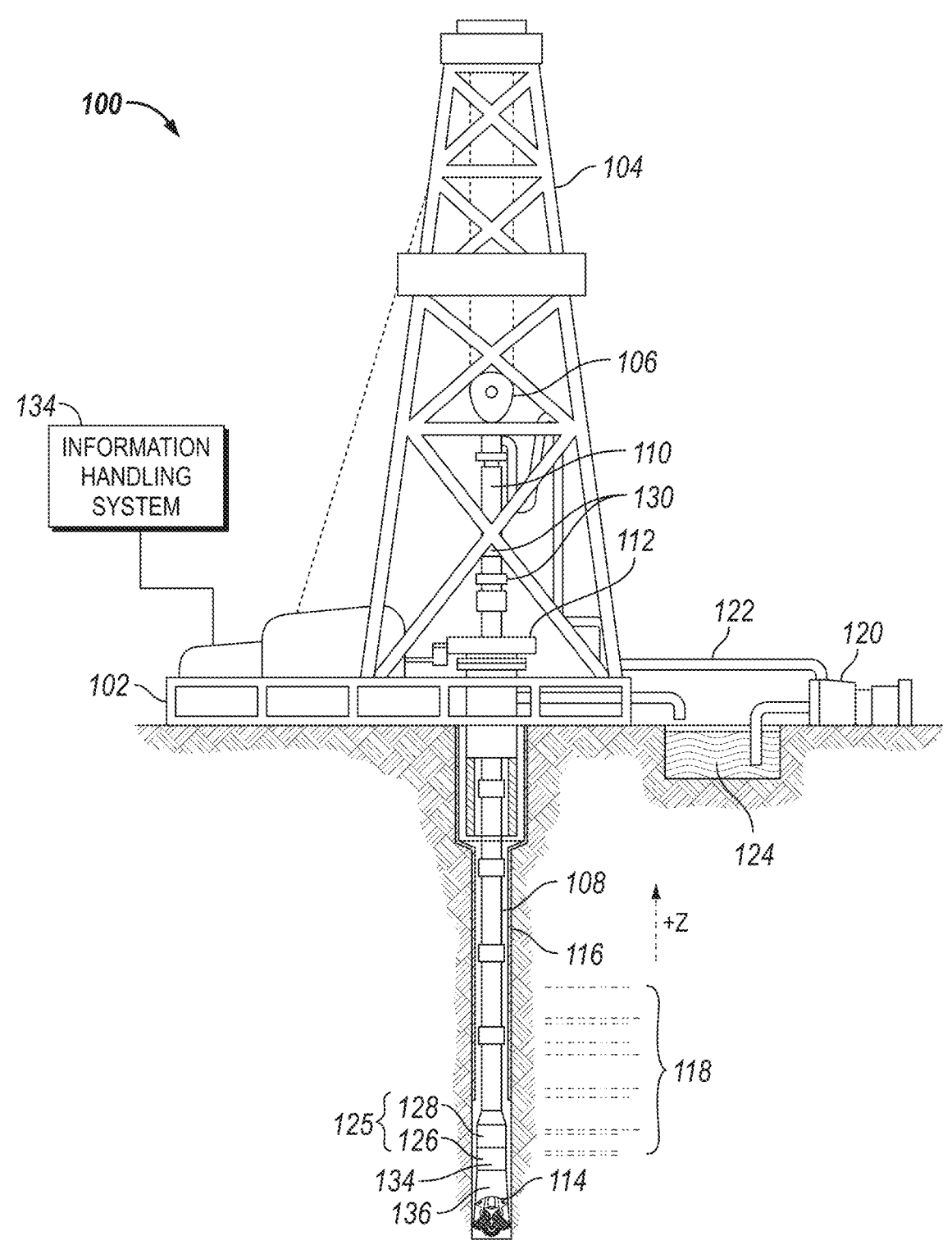
FIG. 1 shows an illustrative logging while drilling (LWD) environment.

The present disclosure relates generally to ultra-deep azimuthal resistivity logging. Ultra-Deep Azimuthal Resistivity (UDAR) tools project Electromagnetic (EM) energy from a transmitter into the surrounding subsurface geology. The changes that the formation and fluids surrounding the UDAR transmitter and receivers make to the transmitted EM field are measured at single or multiple receivers. These measurements may be transmitted to surface but may also be processed/inverted downhole.

All nine components (tensor directions) of the EM tensor and ratios of these components for both real and imaginary measurements for each frequency measured at each receiver antenna may be transmitted or inverted downhole. At surface, inversion algorithms may be used to match models to the multi component data to produce a low misfit model that may represent the position of subsurface fluids and formations, these inversions may also be run downhole in the UDAR tool firmware. Inversions may be deployed that represent models in 1 dimension, 2 dimensions or 3 dimensions. These inversions may be used to generate a subsurface model that represents the position of the borehole in relation to the surrounding formation and fluids. The direction of the borehole may then be changed to optimize the wells position by transmitted commands downhole to rotary steerable tools or using directional control with a mud motor. This process is reacting to the position of boundaries that may be surrounding the borehole, which may be referred to as "look around" process.

The EM energy transmitted by UDAR tools enters the formations ahead as well as around the UDAR transmitter. The contribution of the EM field influenced by formation and fluids ahead of the transmitter is smaller than from the units surrounding the well. UDAR tools are therefore less sensitive to the contribution ahead of the tool. True 3D EM inversions may accommodate this look ahead sensitivity. When approaching a change in the geology or fluids ahead of the transmitter the influence on the EM field may be seen as a deflection or change in gradient when the components or ratios of the components are plotted. As the transmitter gets closer to the change ahead, the magnitude of the change in the components increases as the UDAR tool becomes more sensitive to the change ahead. Due to the speed of drilling and the sensitivity ahead, this approach to a change in resistivity may occur very quickly, therefore the earlier that it is identified the quicker and more certain a well placement or stopping decision may be made.

The initial deflection of measured EM components is very small, inverting the data at this stage may produce a result that very roughly defines the change in geology ahead, but it may be faint/not clear and has high uncertainty and subject to measurement and background noise. This may make decisions on any inversion result difficult.

In addition, the weak look ahead signal may be proportionately more affected by noise in the signal measurement than the portion of the signal that is from the EM field around the tool. This is why most EM inversions have been focused upon the look around portion of the signal. However, look ahead sensitivity may enable the identification of changes in the position of resistivity bodies before they are penetrated, allowing the well path to form a borehole to be stopped early or deflected to take advantage of this look ahead information, hence improving these signals is critical.

Generally, in real formations, a resistivity of the formation varies in different directions, for example, a formation resistivity may vary in the x, y, and z coordinates. In electrically anisotropic formations, anisotropy may be attributable to extremely fine layering during the sedimentary buildup of the formation. A formation Cartesian coordinate system may be oriented such that the x-y plane is parallel to the formation layers and the z axis is perpendicular to the formation layers. Resistivities measured in the x and y directions (e.g., Rx and Ry, respectively), may tend to be more similar relative to resistivity measured in the x direction (e.g., Rz). The resistivity in a direction parallel to the formation plane (i.e., the x-y plane) may be referred to as the horizontal resistivity, Rh, and the resistivity in the direction perpendicular to the plane of the formation (i.e., the z direction) may be referred to as the vertical resistivity, Rv. Due to the geological processes which deposit and form lithified sedimentary depositions, it may be more common to see gradational lithological changes rather than abrupt lithological changes. Likewise, these changes may be reflected in the responses measured from a formation evaluation tool, such as an electromagnetic resistivity tool.

The raw measurements acquired with an electromagnetic resistivity tool (e.g., apparent resistivity) may be challenging to evaluate and/or interpret without the application of an inversion. An inversion may be a mathematical or statistical technique which incorporates forward modeling to recover plausible physical formation properties from raw measurements collected by a formation evaluation tool. Prior knowledge related to the formation in which the measurements were acquired may be incorporated into the forward modelling process in order to place boundaries around the potential interpretations (e.g., solutions) on which the forward model may converge. Additionally, the prior knowledge about the formation may create a range of potential inversion assumptions where any particular assumption in the range of assumptions may be associated with different statistical likelihoods of occurrence. As a result, an inversion may create a multitude of interpretations which may further be ranked according to their statistical likelihood of occurrence. Due to the statistical and iterative nature of an inversion calculation, dramatic departures or abrupt changes in the raw measurements (e.g., inputs to the inversion) collected by a formation evaluation tool (e.g., electromagnetic resistivity tool) may create unstable inversion solutions. While these abrupt changes may corrupt or obfuscate the formation properties in the geospatial vicinity where the data was collected, they may additionally indicate geologic discontinuities such as natural or man-made fractures and faults.

The disclosed apparatuses, systems and methods may be best understood in the context of the larger systems in which they operate. FIG. 1 illustrates a diagrammatic view of an exemplary logging while drilling (LWD) and/or measurement while drilling (MWD) well measurement system 100 in which the present disclosure may be implemented. As depicted in FIG. 1, a drilling platform 102 is equipped with a derrick 104 that supports a hoist 106 for raising and lowering a drill string 108. Hoist 106 suspends a top drive 110 suitable for rotating the drill string 108 and lowering the drill string 108 through the well head 112. Connected to the lower end of the drill string 108 is a drill bit 114. As drill bit 114 rotates, drill bit 114 creates a borehole 116 that passes through various subterranean formation 118. A pump 120 circulates drilling fluid through a supply pipe 122 to top drive 110, down through the interior of drill string 108, through orifices in drill bit 114, back to the surface via the annulus around drill string 108, and into a retention pit 124. The drilling fluid transports cuttings from the borehole 116 into retention pit 124 and aids in maintaining the integrity of the borehole 116. Various materials can be used for drilling fluid, including oil-based fluids and water-based fluids.

As depicted in FIG. 1, logging tools 126 (which may up at least a part of UDAR) are integrated into the bottom-hole assembly 125 near drill bit 114. As the drill bit 114 extends borehole 116 through the subterranean formation 118, logging tools 126 collect measurements relating to various formation properties as well as the orientation of the tool and various other drilling conditions. Bottom-hole assembly 125 may also include a telemetry sub 128 to transfer measurement data to a surface receiver 130 and to receive commands from the surface. In some embodiments, the telemetry sub 128 communicates with a surface receiver 130 using mud pulse telemetry. In other cases, the telemetry sub 128 does not communicate with the surface, but rather stores logging data for later retrieval at the surface when the logging assembly is recovered.

Notably, one or more of the bottom-hole assembly 125, the logging tools 126, and the telemetry sub 128 may also operate using a non-conductive cable (e.g., slickline, etc.) with a local power supply, such as batteries and the like. When employing non-conductive cable, communication may be supported using, for example, wireless protocols (e.g., EM, acoustic, etc.) and/or measurements and logging data may be stored in local memory for subsequent retrieval at the surface, as is appreciated by those skilled in the art.

Each of the logging tools 126 may include a plurality of tool components, spaced apart from each other, and communicatively coupled with one or more wires. Logging tools 126 may include tools such as the one shown in FIG. 4 in order to perform resistivity, or conductivity logging. The telemetry sub 128 may include wireless telemetry or logging capabilities, or both, such as to transmit or later provide information indicative of received energy/waveforms to operators on the surface or for later access and data processing for the evaluation of formation 118 properties.

Further, bottom-hole assembly 125 may include a telemetry sub to maintain a communications link with the surface (e.g., with information handling system 134). Such telemetry communications may be used for (i) transferring tool measurement data from bottom-hole assembly (BHA) 125 to surface receivers, and/or (ii) receiving commands (from the surface) to bottom-hole assembly 125 (e.g., for use of one or more tool(s) in bottom-hole assembly 125). In examples, telemetry communications may be at least in part between bottom-hole assembly 125 and information handling system 134. Additionally, information handling system 134 may be disposed at surface and communication with BHA 125 as well as logging tool 126 and/or telemetry sub 128.

As illustrated, the information handling system 134 may comprise any instrumentality or aggregate of instrumentalities operable to compute, estimate, classify, process, transmit, broadcast, receive, retrieve, originate, switch, store, display, manifest, detect, record, reproduce, handle, or utilize any form of information, intelligence, or data for business, scientific, control, or other purposes. For example, an information handling system 134 may be a personal computer, a network storage device, or any other suitable device and may vary in size, shape, performance, functionality, and price.

Information handling system 134 may include a processing unit (e.g., microprocessor, central processing unit, etc.) that may process drilling data from rotary steerable system (RSS) 136 which may be disposed on bottom-hole assembly 125, by executing software or instructions obtained from a local non-transitory computer readable media (e.g., optical disks, magnetic disks). The non-transitory computer readable media may store software or instructions of the methods described herein. Non-transitory computer readable media may include any instrumentality or aggregation of instrumentalities that may retain data and/or instructions for a period of time. Non-transitory computer readable media may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such wires, optical fibers, microwaves, radio waves, and other electromagnetic and/or optical carriers; and/or any combination of the foregoing. Information handling system 134 may also include input device(s) (e.g., keyboard, mouse, touchpad, etc.) and output device(s) (e.g., monitor, printer, etc.). The input device(s) and output device(s) provide a user interface that enables an operator to interact with any device disposed or a part of bottom-hole assembly 125, discussed below, and/or software executed by a processing unit. For example, information handling system 134 may enable an operator to select analysis options, view collected log data, view analysis results, and/or perform other tasks.

Non-limiting examples of techniques for transferring tool measurement data (to the surface) include mud pulse telemetry and through-wall acoustic signaling. For through-wall acoustic signaling, one or more repeater(s) may detect, amplify, and re-transmit signals from bottom-hole assembly 125 to the surface (e.g., to information handling system 134), and conversely, from the surface (e.g., from information handling system 134) to bottom-hole assembly 125.

A repeater is a device which may be used to receive and send signals from one component of well measurement system 100 to another component of well measurement system 100. As a non-limiting example, repeaters may be used to receive a signal from a tool on bottom-hole assembly 125 and send that signal to information handling system 134. Two or more repeaters may be used together, in series, such that a signal to/from bottom-hole assembly 125 may be relayed through two or more repeaters before reaching its destination.

In some embodiments, one or more of the logging tools 126 may communicate with a surface receiver 130, such as a wired drill pipe. In other cases, one or more of the logging tools 126 may communicate with a surface receiver 130 by wireless signal transmission. Surface receiver 130 may further transfer data received to information handling system 134. Additionally, information handling system 134 may use surface receiver 130 to communicate with logging tools 126. In at least some cases, one or more of the logging tools 126 may receive electrical power from a wire that extends to the surface, including wires extending through a wired drill pipe. In at least some instances the methods and techniques of the present disclosure may be performed by a computing device (not shown) on the surface. In some embodiments, the computing device may be included in surface receiver

130. For example, surface receiver 130 of well measurement system 100 at the surface may include one or more of wireless telemetry, processor circuitry, or memory facilities, such as to support substantially real-time processing of data received from one or more of the logging tools 126. In some embodiments, data is processed at some time subsequent to its collection, wherein the data may be stored on the surface at surface receiver 130, stored downhole in telemetry sub 128, or both, until it is retrieved for processing.

Additionally, communications may be performed at least in part by a transducer. A transducer is a device which may be configured to convert non-digital data (e.g., vibrations, other analog data) into a digital form suitable for information handling system 134. As a non-limiting example, one or more transducer(s) may convert signals between mechanical and electrical forms, enabling information handling system 134 to receive the signals from a telemetry sub, on bottom-hole assembly 125, and conversely, transmit a downlink signal to the telemetry sub on bottom-hole assembly 125. In any embodiment, transducer may be located at the surface and/or any part of drill string 108 (e.g., as part of bottom-hole assembly 125).

Drill bit 114 is a machine which may be used to cut through, scrape, and/or crush (i.e., break apart) materials in the ground (e.g., rocks, dirt, clay, etc.). Drill bit 114 may be disposed at the frontmost point of drill string 108 and bottom-hole assembly 125. In any embodiment, drill bit 114 may include one or more cutting edges (e.g., hardened metal points, surfaces, blades, protrusions, etc.) to form a geometry which aids in breaking ground materials loose and further crushing that material into smaller sizes. In any embodiment, drill bit 114 may be rotated and forced into (i.e., pushed against) the ground material to cause the cutting, scraping, and crushing action. The rotations of drill bit 114 may be caused by top drive 110 and/or one or more motor(s) located on drill string 108 (e.g., on bottom-hole assembly 125).

Figure 2:
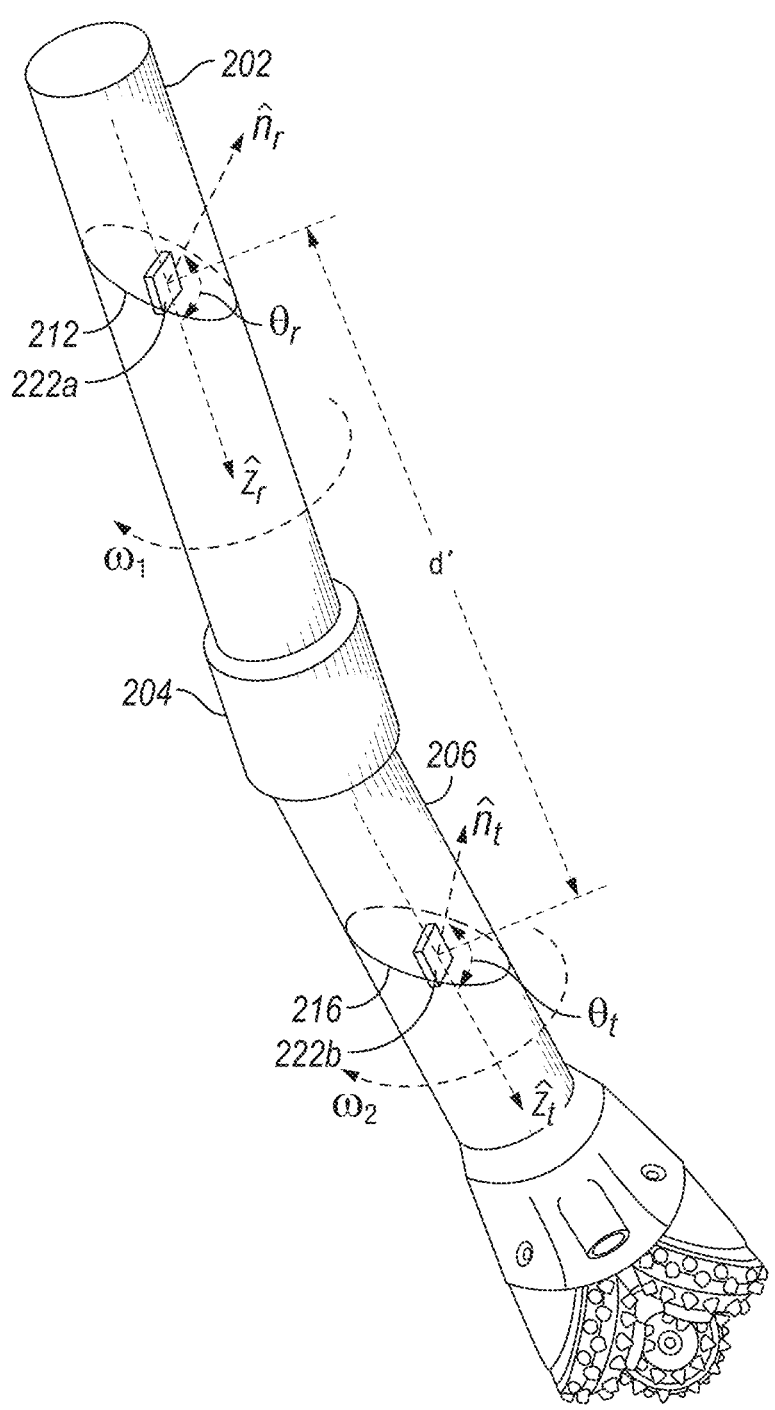
FIG. 2 shows an illustrative drill string with two logging tool modules.

FIG. 2 shows an illustrative example of a deep formation evaluation logging tool that includes two LWD tool modules 202 and 206 at different locations and orientations along a drill string. In the example shown, a resistivity logging tool receive antenna 212 and a corresponding receive antenna position measurement device 222 $a$ may be housed within LWD tool module 202, while a resistivity logging tool transmit antenna 216 and a corresponding transmit antenna position measurement device 222 $b$ (components of an "at bit" instrument) are housed within LWD tool module 206. The position measurement devices may locate the position of each corresponding antenna, which may be expressed, for example, in terms of each antenna's tilt angle ($\theta_r$ and $\theta_t$ relative to the $z_r$ and $z_t$ axes respectively; generally fixed and known), each antenna's azimuthal angle ($\alpha_r$ and $\alpha_t$ relative to the x axis), each LWD tool module's inclination angle ($\varphi_r$ and $\varphi_t$) and the distance d' between the antennas. Various methods may be used to locate the antenna positions (e.g., relative to a reference position on the surface), several of which are described in more detail below. It should be noted that although the bent sub angles are typically less than five degrees, the figures show much more pronounced angles to better illustrate the effect of the angles on the relative spatial locations of the antennas, described in more detail below.

The above-described antenna and LWD tool module orientations may be used to calibrate tool responses prior to performing an inversion process to model the surrounding formation. Such calibration is performed in order to be able to compare the modeled and measure results, as the modeled results assume known and fixed orientations and spatial locations of the resistivity logging tool transmit and receive antennas relative to each other, but the measured results may originate from antennas with any of a number of different relative orientations and spatial locations other than those presumed in the model. Measured and modeled results may be in the form of complex voltages, complex currents, resistivity values derived from measured/modeled voltages and/or currents, and/or ratios of voltages, currents and/or resistivities, just to name a few examples. Part of this calibration can be performed mathematically as one or more matrix rotations, while another part may be performed as a derivation of the relative spatial locations of and/or distance between antennas based on the antennas' locations and orientations. The resulting calibrated response is provided to the inversion, which uses these inputs to model the formation.

Equation (1), expressed more simply in equation (2), illustrates the rotation portion of the calibration process, taking into account each of the above-described angles:

$$V_R^T(t_0) = \begin{bmatrix} \sin(\theta_t + \varnothing_t(t_0))\cos(\propto_t (t_0)) \\ \sin(\theta_t + \varnothing_t(t_0))\sin(\propto_t (t_0)) \\ \cos(\theta_t + \varnothing_t(t_0)) \end{bmatrix}^T \begin{bmatrix} V_x^x(t_0) & V_y^x(t_0) & V_z^x(t_0) \\ V_x^y(t_0) & V_y^y(t_0) & V_z^y(t_0) \\ V_x^z(t_0) & V_y^z(t_0) & V_z^z(t_0) \end{bmatrix} \tag{1}$$

$$\begin{bmatrix} \sin(\theta_r + \varnothing_r(t_0))\cos(\propto_r (t_0)) \\ \sin(\theta_r + \varnothing_r(t_0))\sin(\propto_r (t_0)) \\ \cos(\theta_r + \varnothing_r(t_0)) \end{bmatrix}$$

$$V_R^T(t_0) = T_{VECTOR}^T(t_0) * V_{MATRIX}(t_0) * R_{VECTOR}(t_0) \tag{2}$$

where $$T_{VECTOR}^T(t_0)$$

(shown in transposed form for convenience) is given by the transmit antenna's known tilt angle $\theta_t$, and by the inclination angle $\varnothing_t$, and azimuthal angle $\propto_t$ as determined by the transmit antenna's position measurement device at time $t_0$; $R_{VECTOR}(t_0)$ is given by the receive antenna's known tilt angle $\theta_r$, and by the inclination angle $\varnothing_r$ azimuthal angle $\propto_r$ as determined by the receive antenna's position measurement device at time $t_0$; and $V_{MATRIX}(t_0)$ is a 3×3 voltage matrix consisting of nine components $$V_j^i.$$

Each component represents a theoretical voltage a receive antenna with a j axis orientation (x, y or z) in response to a signal from a transmit antenna with an i axis orientation (also x, y or z) for a given formation model, operating frequency and spacing d'.

Another part of the calibration may involve determining the distance between the transmit antenna and the receive antenna. The distance between transmit and receive antennas changes when two or more LWD tool modules are positioned such that they no longer share a common z axis. For example, in FIG. 2 both LWD tool modules 202 and 206 are inclined such that each z axis ($z_r$ and $z_t$) is inclined at a different inclination angle $\phi$ ($\phi_r$ and $\phi_t$) relative to a vertical reference z axis. The inclination angle change reduces the original distance between the receive and transmit antennas 212 and 216 from original distance d when the drillstring was straight (bent sub 204 set to 0 degrees) to distance d'.

As a further complication to measuring formation resistivity, boreholes are generally perpendicular to formation beds. The angle between the axis of the well bore and the orientation of the formation beds (as represented by the normal vector) has two components. These components are the dip angle and the azimuth angle. The dip angle is the angle between the borehole axis and the normal vector for the formation bed. The azimuth angle is the direction in which the borehole's axis "leans away from" the normal vector. Electromagnetic resistivity logging measurements are a complex function of formation resistivity, formation anisotropy, and the formation dip and azimuth angles, which may all be unknown. A triaxial induction well logging tool may be used to detect formation properties such as resistivity anisotropy, which is one of the important parameters in evaluation subterranean formations such as sand-shale reservoirs or fractured reservoirs. However, the resistivity anisotropy parameter cannot be obtained without performing a numerical inversion process. Specifically, numerical inversion may be utilized to obtain accurate formation resistivity anisotropy parameters. The log inversion utilized for anisotropy determination may involve a large number of inversion parameters to be determined by an algorithm referred to as the ID vertical inversion. Generally, this algorithm may utilize large amounts of processing time and be sensitive to noise from logging, the logging environment characteristics and borehole correction, which could result in errors in the inverted vertical resistivity.

Figure 3:
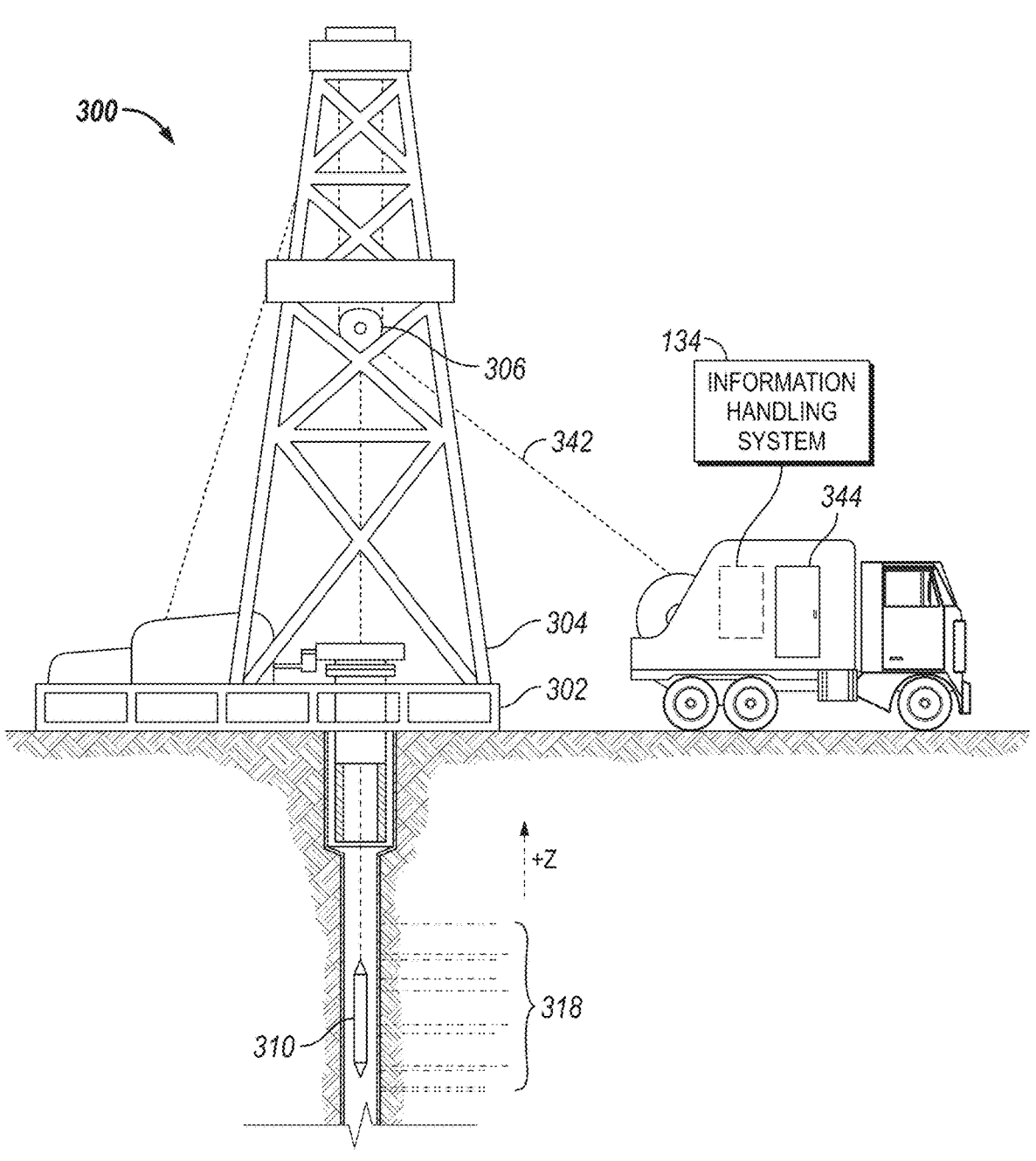
FIG. 3 shows an illustrative logging tool and a surface system.

FIG. 3 illustrates a diagrammatic view of a conveyance logging wellbore operating environment 300 in which the present disclosure may be implemented. As depicted in FIG. 3, a hoist 306 may be included as a portion of a platform 302, such as that coupled to derrick 304, and used with a conveyance 342 to raise or lower equipment such as resistivity logging tool 310 into or out of a borehole. Resistivity logging tool 310 may include, for example, tools such as the one shown in FIG. 4. A conveyance 342 may provide a communicative coupling between the resistivity logging tool 310 and a logging facility 344 at the surface. The conveyance 342 may include wires (one or more wires), slicklines, cables, or the like, as well as tubular conveyances such as coiled tubing, joint tubing, or other tubulars, and may include a downhole tractor. Additionally, power may be supplied via conveyance 342 to meet the power needs of the tool. The resistivity logging tool 310 may have a local power supply, such as batteries, downhole generator and the like. When employing non-conductive cables, coiled tubing, pipe string, or downhole tractor, communication may be supported using, for example, wireless protocols (e.g., EM, acoustic, etc.), and/or measurements and logging data may be stored in local memory for subsequent retrieval. Logging facility 344 may include information handling system 134 capable of carrying out the methods and techniques of the present disclosure. In this manner, information about the formation 318 may be obtained by resistivity logging tool 310 and processed by a computing device, such as information handling system 134. In some embodiments, information handling system 134 is equipped to process the received information in substantially real-time, while in some embodiments, information handling system 134 can be equipped to store the received information for processing at some subsequent time.

Figure 4:
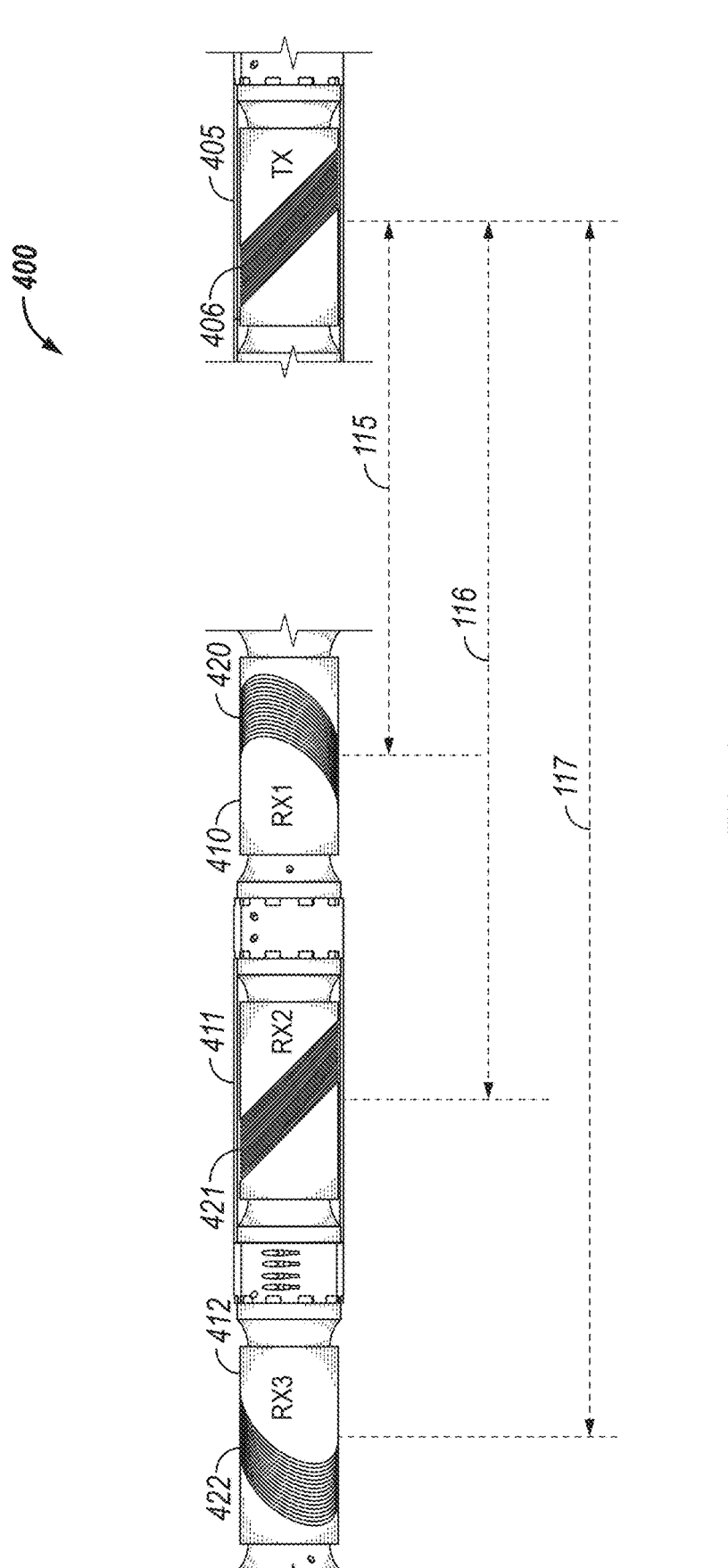
FIG. 4 shows an illustrative logging tool.

FIG. 4 illustrates an example of wellbore tool 400 that may be used in the systems and methods described herein. Wellbore tool 400 may comprise transmitter sub 405 and one or more receiver subs 410, 411, and 412. In some examples, transmitter sub 405 may be referred to as TX and receiver subs 410, 411, and 412 may be referred to as RX1, RX2, and RX3 respectively. Transmitter sub 405 may comprise a transmitter coil 406 which may be an electromagnetic wave source such as a monopole, dipole, quadrupole, or other higher order wave source. Each of the receiver subs 410, 411, and 412 may comprise three or more receiver coils per sub configured to receive an electromagnetic wave from transmitter sub 405. Receiver subs 410, 411, and 412 may be disposed on wellbore tool 400 a distance 415, 416, 417 from transmitter sub1 05. Distance 415, 416, 417 may also be referred to as S1, S2, and S3 respectively.

Referring to FIG. 4 and FIG. 2, first receiver coils 420 are not co-axial with receiver sub 410. There may be an axial offset between first receiver coils 420 and a centerline of receiver sub 410 which may be notated as $\theta_{R1}$. Similarly, for transmitter coil 406, second receiver coils 421, and third receiver coils 422, there may be an axial offset of coils from a centerline of the respective subs notated as $\theta_T$, $\theta_{R2}$, and $\theta_{R3}$ respectively. In addition to axial offset, each of the first receiver coils 420, second receiver coils 421, and third receiver coils 422 may have an azimuthal offset relative to transmitter coil 406. The tilt angle of the transmitter coil is notated as $\theta_T$ and the tilt angle, or azimuthal offset, of each of the receiver coils is notated as $\theta_{R1}$, $\theta_{R2}$, and $\theta_{R3}$ for RX1, RX2, and RX3 respectively. The azimuth angle is dependent on wellbore tool's 400 rotated position in borehole 116 (e.g., referring to FIG. 1). In examples, although not illustrated, $\beta_{off}$ is the difference in azimuthal angle between the transmitter coil and the second receiver coil which may be measured before the tool is inserted into borehole 116. Further, $\beta_{A1}$ is the difference in azimuthal angle between the first receiver coil 420 and the second receiver coil 421 and $\beta_{A2}$ is the difference in azimuthal angle between the third receiver coil 422 and second receiver coil 420. In examples, variables $\beta_{A1}$ and $\beta_{A2}$ may take any value but may follow the following parameters: (1) $\beta_{A1} \neq \beta_{A2}$, (2) $\beta_{A1} \neq 0°$, and (3) $\beta_{A2} \neq 0°$.

Figure 5:
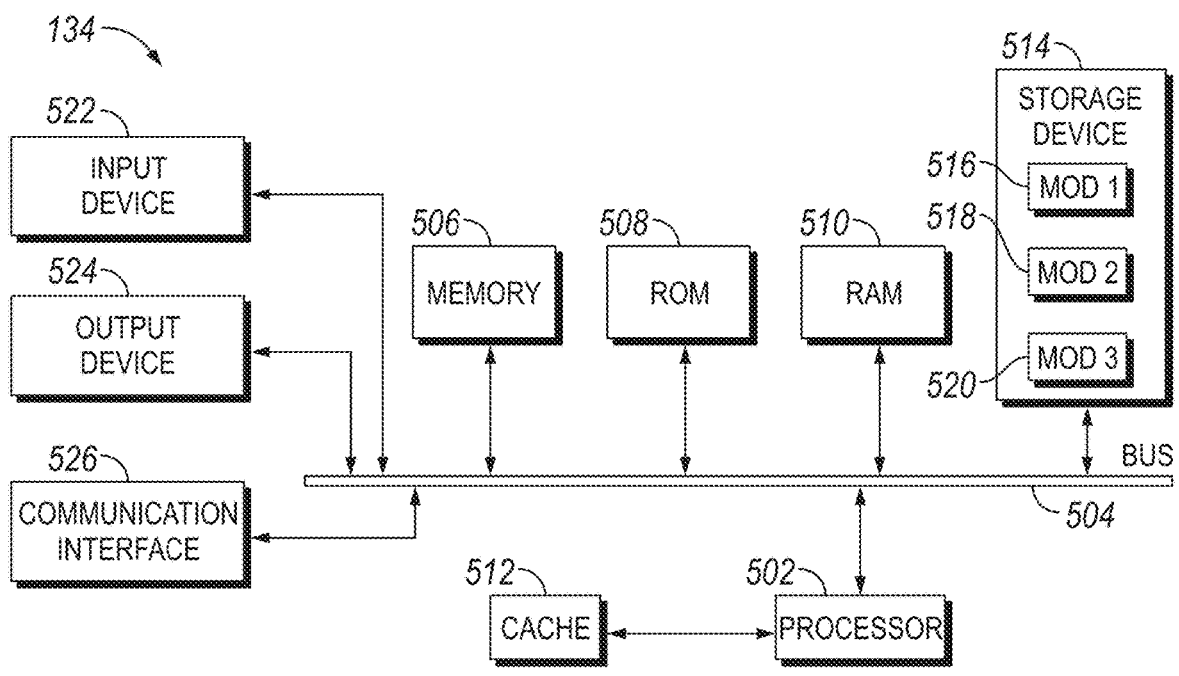
FIG. 5 illustrates a schematic of an information handling system.

FIG. 5 further illustrates an example of information handling system 134 which may be employed to perform various steps, methods, and techniques disclosed herein. Persons of ordinary skill in the art will readily appreciate that other system examples are possible. As illustrated, information handling system 134 includes a processing unit (CPU or processor) 502 and a system bus 504 that couples various system components including system memory 506 such as read only memory (ROM) 508 and random-access memory (RAM) 510 to processor 502. Processors disclosed herein may all be forms of this processor 502. Information handling system 134 may include a cache 512 of high-speed memory connected directly with, in close proximity to, or integrated as part of processor 502. Information handling system 134 copies data from memory 506 and/or storage device 514 to cache 512 for quick access by processor 502. In this way, cache 512 provides a performance boost that avoids processor 502 delays while waiting for data. These and other modules may control or be configured to control processor 502 to perform various operations or actions. Other system memory 506 may be available for use as well. Memory 506 may include multiple different types of memory with different performance characteristics. It may be appreciated that the disclosure may operate on information handling system 134 with more than one processor 502 or on a group or cluster of computing devices networked together to provide greater processing capability. Processor 502 may include any general-purpose processor and a hardware module or software module, such as first module 516, second module 518, and third module 520 stored in storage device 514, configured to control processor 502 as well as a special-purpose processor where software instructions are incorporated into processor 502. Processor 502 may be a self-contained computing system, containing multiple cores or processors, a bus, memory controller, cache, etc. A multi-core processor may be symmetric or asymmetric. Processor 502 may include multiple processors, such as a system having multiple, physically separate processors in different sockets, or a system having multiple processor cores on a single physical chip. Similarly, processor 502 may include multiple distributed processors located in multiple separate computing devices but working together such as via a communications network. Multiple processors or processor cores may share resources such as memory 506 or cache 512 or may operate using independent resources. Processor 502 may include one or more state machines, an application specific integrated circuit (ASIC), or a programmable gate array (PGA) including a field PGA (FPGA).

Each individual component discussed above may be coupled to system bus 504, which may connect each and every individual component to each other. System bus 504 may be any of several types of bus structures including a memory bus or memory controller, a peripheral bus, and a local bus using any of a variety of bus architectures. A basic input/output (BIOS) stored in ROM 508 or the like, may provide the basic routine that helps to transfer information between elements within information handling system 134, such as during start-up. Information handling system 134 further includes storage devices 514 or computer-readable storage media such as a hard disk drive, a magnetic disk drive, an optical disk drive, tape drive, solid-state drive, RAM drive, removable storage devices, a redundant array of inexpensive disks (RAID), hybrid storage device, or the like.

Storage device 514 may include software modules 516, 518, and 520 for controlling processor 502. Information handling system 134 may include other hardware or software modules. Storage device 514 is connected to the system bus 504 by a drive interface. The drives and the associated computer-readable storage devices provide non-volatile storage of computer-readable instructions, data structures, program modules and other data for information handling system 134. In one aspect, a hardware module that performs a particular function includes the software component stored in a tangible computer-readable storage device in connection with hardware components, such as processor 502, system bus 504, and so forth, to carry out a particular function. In another aspect, the system may use a processor and computer-readable storage device to store instructions which, when executed by the processor, cause the processor to perform operations, a method or other specific actions. The basic components and appropriate variations may be modified depending on the type of device, such as whether information handling system 134 is a small, handheld computing device, a desktop computer, or a computer server. When processor 502 executes instructions to perform "operations", processor 502 may perform the operations directly and/or facilitate, direct, or cooperate with another device or component to perform the operations.

As illustrated, information handling system 134 employs storage device 514, which may be a hard disk or other types of computer-readable storage devices which may store data that are accessible by a computer, such as magnetic cassettes, flash memory cards, digital versatile disks (DVDs), cartridges, random access memories (RAMs) 510, read only memory (ROM) 508, a cable containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with information handling system 134, an input device 522 represents any number of input mechanisms, such as a microphone for speech, a touch-sensitive screen for gesture or graphical input, keyboard, mouse, motion input, speech and so forth. Additionally, input device 522 may receive one or more measurements from bottom-hole assembly 125 (e.g., referring to FIG. 1), discussed above. An output device 524 may also be one or more of a number of output mechanisms known to those of skill in the art. In some instances, multimodal systems enable a user to provide multiple types of input to communicate with information handling system 134. Communications interface 526 generally governs and manages the user input and system output. There is no restriction on operating on any particular hardware arrangement and therefore the basic hardware depicted may easily be substituted for improved hardware or firmware arrangements as they are developed.

As illustrated, each individual component described above is depicted and disclosed as individual functional blocks. The functions these blocks represent may be provided through the use of either shared or dedicated hardware, including, but not limited to, hardware capable of executing software and hardware, such as a processor 502, that is purpose-built to operate as an equivalent to software executing on a general-purpose processor. For example, the functions of one or more processors presented in FIG. 5 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 508 for storing software performing the operations described below, and random-access memory (RAM) 510 for storing results. Very large-scale integration (VLSI) hardware embodiments, as well as custom VLSI circuitry in combination with a general-purpose DSP circuit, may also be provided.

Figure 6:
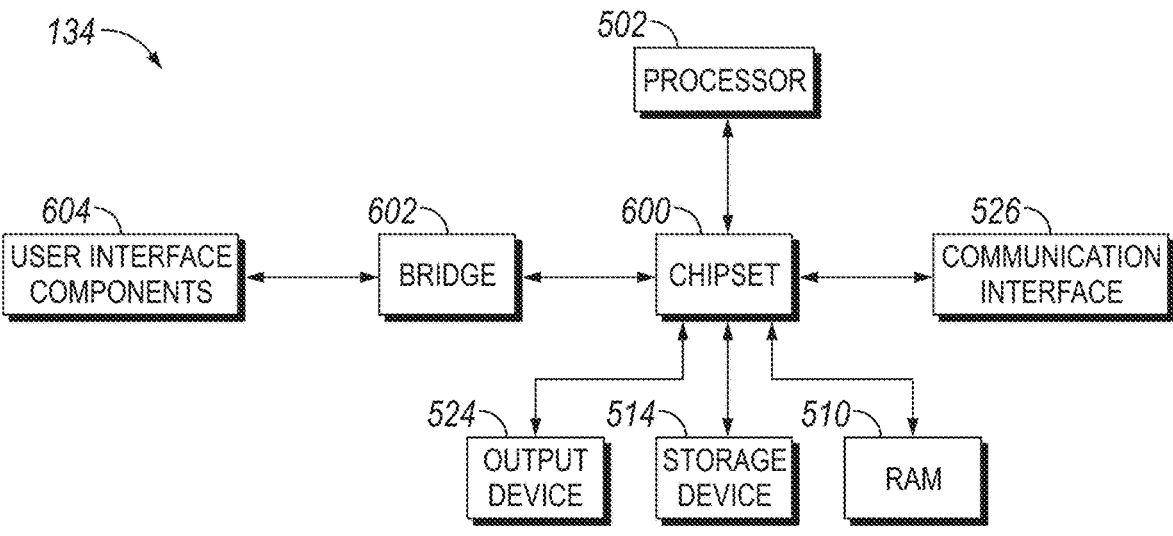
FIG. 6 illustrates a schematic of a chip set.

FIG. 6 illustrates an example of information handling system 134 having a chipset architecture that may be used in executing the described method and generating and displaying a graphical user interface (GUI). Information handling system 134 is an example of computer hardware, software, and firmware that may be used to implement the disclosed technology.

Information handling system 134 may include a processor 502, representative of any number of physically and/or logically distinct resources capable of executing software, firmware, and hardware configured to perform identified computations. Processor 502 may communicate with a chipset 600 that may control input to and output from processor 502. In this example, chipset 600 outputs information to output device 524, such as a display, and may read and write information to storage device 514, which may include, for example, magnetic media, and solid-state media.

Chipset 600 may also read data from and write data to RAM 510. A bridge 602 for interfacing with a variety of user interface components 604 may be provided for interfacing with chipset 600. Such user interface components 604 may include a keyboard, a microphone, touch detection and processing circuitry, a pointing device, such as a mouse, and so on. In general, inputs to information handling system 134 may come from any of a variety of sources, machine generated and/or human generated.

Chipset 600 may also interface with one or more communication interfaces 526 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 502 analyzing data stored in storage device 514 or RAM 510.

Further, information handling system 134 receives inputs from a user via user interface components 604 and executes appropriate functions, such as browsing functions by interpreting these inputs using processor 502.

In examples, information handling system 134 may also include tangible and/or non-transitory computer-readable storage devices for carrying or having computer-executable instructions or data structures stored thereon. Such tangible computer-readable storage devices may be any available device that may be accessed by a general purpose or special purpose computer, including the functional design of any special purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store program code in the form of computer-executable instructions, data structures, or processor chip design. When information or instructions are provided via a network, or another communications connection (either hardwired, wireless, or combination thereof), to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include programming modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code for executing steps of the methods disclosed herein. The particular sequence of such executable instructions or associated data structures represents examples of corresponding acts for implementing the functions described in such steps.

In additional examples, methods may be practiced in network computing environments with many types of computer system configurations, including personal computers, hand-held devices, multi-processor systems, microprocessor-based or programmable consumer electronics, network PCs, minicomputers, mainframe computers, and the like. Examples may also be practiced in distributed computing environments where tasks are performed by local and remote processing devices that are linked (either by hard-wired links, wireless links, or by a combination thereof) through a communications network. In a distributed computing environment, program modules may be located in both local and remote memory storage devices.

Figure 7:
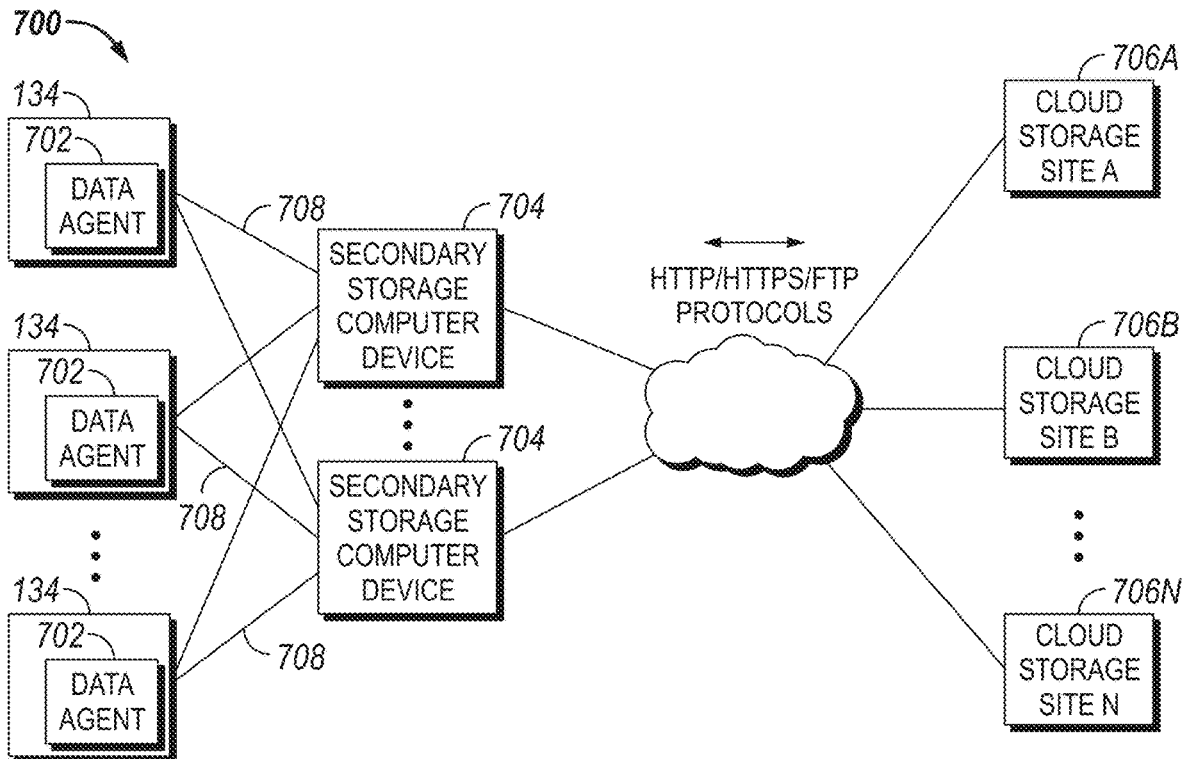
FIG. 7 illustrates a computing network.

FIG. 7 illustrates an example of one arrangement of resources in a computing network 700 that may employ the processes and techniques described herein, although many others are of course possible. As noted above, an information handling system 134, as part of their function, may utilize data, which includes files, directories, metadata (e.g., access control list (ACLS) creation/edit dates associated with the data, etc.), and other data objects. The data on the information handling system 134 is typically a primary copy (e.g., a production copy). During a copy, backup, archive or other storage operation, information handling system 134 may send a copy of some data objects (or some components thereof) to a secondary storage computing device 704 by utilizing one or more data agents 702.

A data agent 702 may be a desktop application, website application, or any software-based application that is run on information handling system 134. As illustrated, information handling system 134 may be disposed at any rig site (e.g., referring to FIG. 1), off site location, or repair and manufacturing center. The data agent may communicate with a secondary storage computing device 704 using communication protocol 708 in a wired or wireless system. Communication protocol 708 may function and operate as an input to a website application. In the website application, field data related to pre- and post-operations, generated DTCs, notes, and the like may be uploaded. Additionally, information handling system 134 may utilize communication protocol 708 to access processed measurements, operations with similar DTCs, troubleshooting findings, historical run data, and/or the like. This information is accessed from secondary storage computing device 704 by data agent 702, which is loaded on information handling system 134.

Secondary storage computing device 704 may operate and function to create secondary copies of primary data objects (or some components thereof) in various cloud storage sites 706A-N. Additionally, secondary storage computing device 704 may run determinative algorithms on data uploaded from one or more information handling systems 134, discussed further below.

Communications between the secondary storage computing devices 704 and cloud storage sites 706A-N may utilize REST protocols (Representational state transfer interfaces) that satisfy basic C/R/U/D semantics (Create/Read/Update/Delete semantics), or other hypertext transfer protocol ("HTTP")-based or file-transfer protocol ("FTP")-based protocols (e.g., Simple Object Access Protocol).

In conjunction with creating secondary copies in cloud storage sites 706A-N, the secondary storage computing device 704 may also perform local content indexing and/or local object-level, sub-object-level or block-level deduplication when performing storage operations involving various cloud storage sites 706A-N. Cloud storage sites 706A-N may further record and maintain, EM logs, map DTC codes, store repair and maintenance data, store operational data, and/or provide outputs from determinative algorithms that are located in cloud storage sites 706A-N. In a non-limiting example, this type of network may be utilized as a platform to store, backup, analyze, import, preform extract, transform and load ("ETL") processes, mathematically process, apply machine learning models, and augment EM measurement data sets.

A machine learning model may be an empirically derived model which may result from a machine learning algorithm identifying one or more underlying relationships within a dataset. In comparison to a physics-based model, such as Maxwell's Equations, which are derived from first principles and define the mathematical relationship of a system, a pure machine learning model may not be derived from first principles. Once a machine learning model is developed, it may be queried in order to predict one or more outcomes for a given set of inputs. The type of input data used to query the model to create the prediction may correlate both in category and type to the dataset from which the model was developed.

The structure of, and the data contained within a dataset provided to a machine learning algorithm may vary depending on the intended function of the resulting machine learning model. The rows of data, or data points, within a dataset may contain one or more independent values. Additionally, datasets may contain corresponding dependent values. The independent values of a dataset may be referred to as "features," and a collection of features may be referred to as a "feature space." If dependent values are available in a dataset, they may be referred to as outcomes or "target values." Although dependent values may be a component of a dataset for certain algorithms, not all algorithms may utilize a dataset with dependent values. Furthermore, both the independent and dependent values of the dataset may comprise either numerical or categorical values.

While it may be true that machine learning model development is more successful with a larger dataset, it may also be the case that the whole dataset isn't used to train the model. A test dataset may be a portion of the original dataset which is not presented to the algorithm for model training purposes. Instead, the test dataset may be used for what may be known as "model validation," which may be a mathematical evaluation of how successfully a machine learning algorithm has learned and incorporated the underlying relationships within the original dataset into a machine learning model. This may include evaluating model performance according to whether the model is over-fit or under-fit. As it may be assumed that all datasets contain some level of error, it may be important to evaluate and optimize the model performance and associated model fit by a model validation. In general, the variability in model fit (e.g.: whether a model is over-fit or under-fit) may be described by the "bias-variance trade-off." As an example, a model with high bias may be an under-fit model, where the developed model is over-simplified, and has either not fully learned the relationships within the dataset or has over-generalized the underlying relationships. A model with high variance may be an over-fit model which has overlearned about non-generalizable relationships within training dataset which may not be present in the test dataset. In a non-limiting example, these non-generalizable relationships may be driven by factors such as intrinsic error, data heterogeneity, and the presence of outliers within the dataset. The selected ratio of training data to test data may vary based on multiple factors, including, in a non-limiting example, the homogeneity of the dataset, the size of the dataset, the type of algorithm used, and the objective of the model. The ratio of training data to test data may also be determined by the validation method used, wherein some non-limiting examples of validation methods include k-fold cross-validation, stratified k-fold cross-validation, bootstrapping, leave-one-out cross-validation, resubstituting, random sub-sampling, and percentage hold-out.

In addition to the parameters that exist within the dataset, such as the independent and dependent variables, machine learning algorithms may also utilize parameters referred to as "hyperparameters." Each algorithm may have an intrinsic set of hyperparameters which guide what and how an algorithm learns about the training dataset by providing limitations or operational boundaries to the underlying mathematical workflows on which the algorithm functions.

Furthermore, hyperparameters may be classified as either model hyperparameters or algorithm parameters.

Model hyperparameters may guide the level of nuance with which an algorithm learns about a training dataset, and as such model hyperparameters may also impact the performance or accuracy of the model that is ultimately generated. Modifying or tuning the model hyperparameters of an algorithm may result in the generation of substantially different models for a given training dataset. In some cases, the model hyperparameters selected for the algorithm may result in the development of an over-fit or under-fit model. As such, the level to which an algorithm may learn the underlying relationships within a dataset, including the intrinsic error, may be controlled to an extent by tuning the model hyperparameters.

Model hyperparameter selection may be optimized by identifying a set of hyperparameters which minimize a predefined loss function. An example of a loss function for a supervised regression algorithm may include the model error, wherein the optimal set of hyperparameters correlates to a model which produces the lowest difference between the predictions developed by the produced model and the dependent values in the dataset. In addition to model hyperparameters, algorithm hyperparameters may also control the learning process of an algorithm, however algorithm hyperparameters may not influence the model performance. Algorithm hyperparameters may be used to control the speed and quality of the machine learning process. As such, algorithm hyperparameters may affect the computational intensity associated with developing a model from a specific dataset.

Machine learning algorithms, which may be capable of capturing the underlying relationships within a dataset, may be broken into different categories. One such category may include whether the machine learning algorithm functions using supervised, unsupervised, semi-supervised, or reinforcement learning. The objective of a supervised learning algorithm may be to determine one or more dependent variables based on their relationship to one or more independent variables. Supervised learning algorithms are named as such because the dataset includes both independent and corresponding dependent values where the dependent value may be thought of as "the answer," that the model is seeking to predict from the underlying relationships in the dataset.

As such, the objective of a model developed from a supervised learning algorithm may be to predict the outcome of one or more scenarios which do not yet have a known outcome. Supervised learning algorithms may be further divided according to their function as classification and regression algorithms. When the dependent variable is a label or a categorical value, the algorithm may be referred to as a classification algorithm. When the dependent variable is a continuous numerical value, the algorithm may be a regression algorithm. In a non-limiting example, algorithms utilized for supervised learning may include Neural Networks, K-Nearest Neighbors, Naïve Bayes, Decision Trees, Classification Trees, Regression Trees, Random Forests, Linear Regression, Support Vector Machines (SVM), Gradient Boosting Regression, and Perception Back-Propagation.

The objective of unsupervised machine learning may be to identify similarities and/or differences between the data points within the dataset which may allow the dataset to be divided into groups or clusters without the benefit of knowing which group or cluster the data may belong to. Datasets utilized in unsupervised learning may not include a dependent variable as the intended function of this type of algorithm is to identify one or more groupings or clusters within a dataset. In a non-limiting example, algorithms which may be utilized for unsupervised machine learning may include K-means clustering, K-means classification, Fuzzy C-Means, Gaussian Mixture, Hidden Markov Model, Neural Networks, and Hierarchical algorithms.

Figure 8:
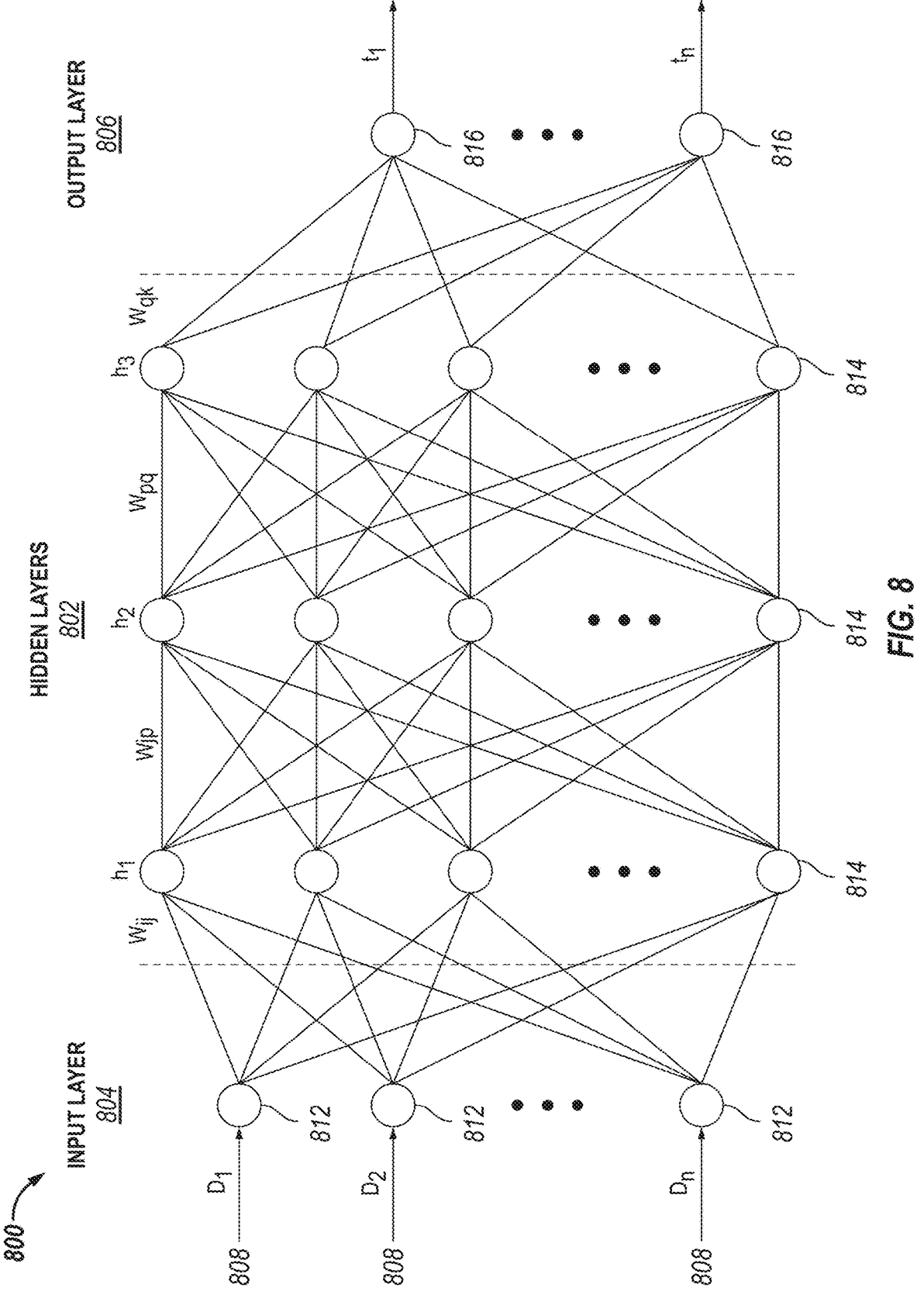
FIG. 8 illustrates a neural network.
Figure 9:
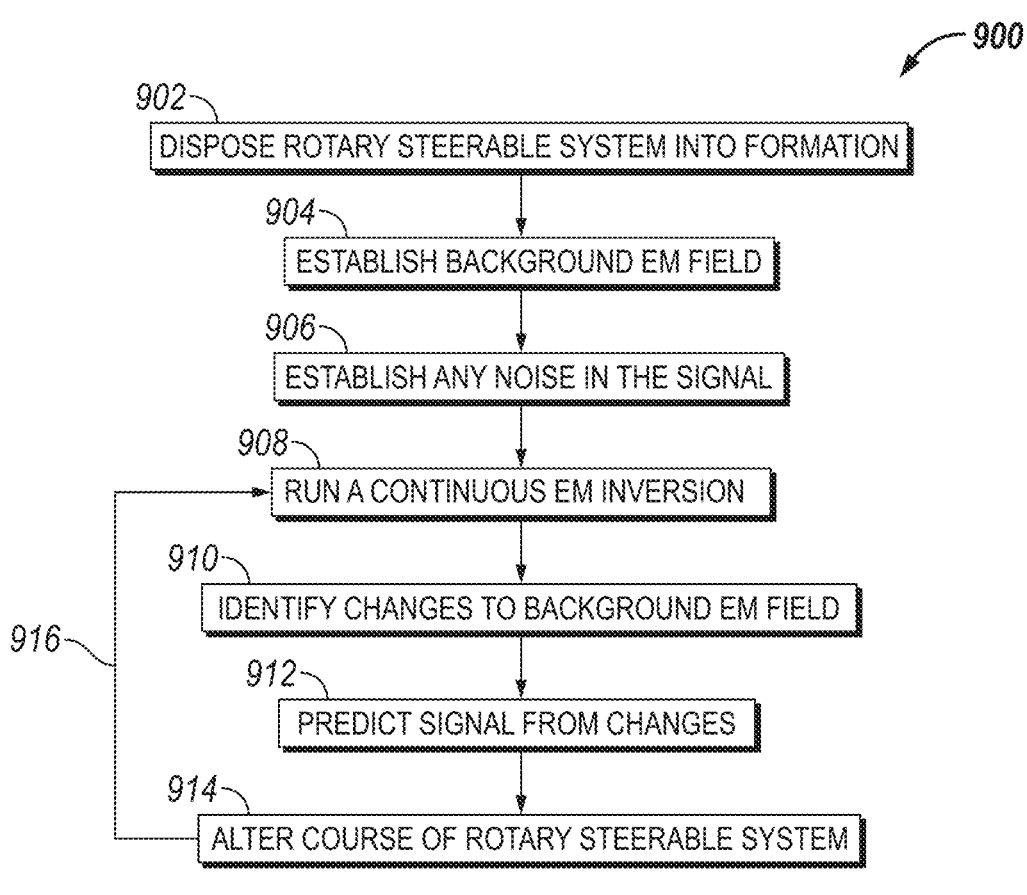
FIG. 9 is a workflow for look ahead prediction.

In examples to determine a relationship using machine learning, a neural network (NN) 800, as illustrated in FIG. 8, may be utilized to model a three-dimensional finite element BHA to analyze lateral deflection experienced by BHA 125 (e.g., referring to FIG. 1) in both its lateral deflection in both inclination and pseudo-azimuth planes in a curved borehole 116 (e.g., referring to FIG. 1). FIG. 9 illustrates neural network (NN) 800. NN 800 may operate utilizing one or more information handling systems 134 (e.g., referring to FIG. 1) on computing network 700. Although a NN is illustrated, multiple models may be used with input output structures. These models may include flexible empirical models such as NN, gaussian processing methods, kriging methods, evolutionary methods such as genetic algorithms, classification methods, clustering methods empirical methods, or physics based methods such as equations of state, thermodynamic models, geological, geochemistry, or chemistry models, or kinetic models or any combinations therein including recursive combinations of similar or dissimilar models and iterative model combinations. A NN 800 is an artificial neural network with one or more hidden layers 802 between input layer 804 and output layer 806. In examples, NN 800 may be software on a single information handling system 134. In other examples, NN 800 may include software running on multiple information handling systems 134 connected wirelessly and/or by a hard-wired connection in a network of multiple information handling systems 134. Herein, NN 800 may be applied in a wide array of implementations.

During operations, inputs 808 data are given to neurons 812 in input layer 804. Neurons 812, 814, and 816 are defined as individual or multiple information handling systems 134 connected in a computing network 700. The output from neurons 812 may be transferred to one or more neurons 814 within one or more hidden layers 802. Hidden layers 802 includes one or more neurons 814 connected in a network that further process information from neurons 812. The number of hidden layers 802 and neurons 812 in hidden layer 802 may be determined by personnel that design NN 800. Hidden layers 802 is defined as a set of information handling system 134 assigned to specific processing. Hidden layers 802 spread computation to multiple neurons 812, which may allow for faster computing, processing, training, and learning by NN 800. Output from NN 800 may be computed by neurons 816. An information handling system 134 (e.g., referring to FIG. 1) being utilized in a computing network 700, NN 800, or alone may control measurement operations downhole with well measurement system 100 (e.g., referring to FIGS. 1&2).

Measurements taken by well measurement system 100 may be utilized by information handling system 134 with or without a computing network 700 or NN 800, as described above, to form resistivity plots for measurements in all nine tensor directions. The resistivity plots may allow for identification of resistivity anomalies at specific locations, which may be utilized for geophysical interpretation and geosteering decisions. Additionally, it incorporates inversion uncertainty information to enhance decision-making accuracy.

FIG. 9 illustrates a workflow 900 for look ahead prediction. Specifically, workflow 900 may predict geology of formation 118 in front of drill bit 114 (e.g., referring to FIG. 1), which may be utilized for geosteering decisions. In examples, workflow 900 may be performed at least in part on information handling system 134. As noted above, information handling system 134 may be wholly at the surface, wholly disposed on logging tool 126, or at least partly disposed of the surface and logging tool 126. Thus, workflow 900 may be performed wholly at surface, wholly on logging tool 126, or at least in part at surface and at least in part on logging tool 126. As illustrated, workflow 900 may begin with block 902, in which a rotary steerable system (RSS) 136 may be disposed into formation 118, using methods and systems described above. In block 902, both drilling and measurement operations may be performed, using methods and systems described above. Measurements, from measurement operations described above, may be analyzed and used to determine geology of formation 118 in front of drill bit 114.

Figure 10:
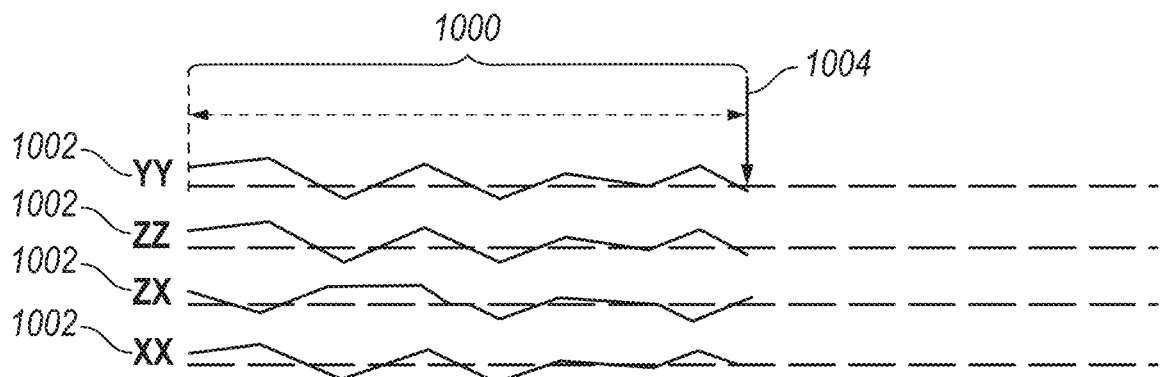
FIG. 10 illustrates a graph showing resistivity measurements in the YY, ZZ, ZX, and XX direction

In block 904, the measurements taken in block 904 may be utilized to establish a background electromagnetic (EM) field. A background EM field may be established with the geology in formation 118 is consistent and/or uniform during measurements. To identify a background EM field, a set of continuous EM measurements will be analyzed to evaluate the most stable EM field signal. For example, FIG. 10 illustrates a graph showing resistivity measurements in the YY, ZZ, ZX, and XX direction. It should be noted that measurements from logging tool 126 may be at least in part analyzed and/or displayed on information handling system 134 (e.g., referring to FIG. 1). As illustrated in FIG. 10, resistivity measurements 1000 are taken along orientation directions 1002 to establish a background electromagnetic (EM) field in a known and consistent geology of formation 118. The trend within the resistivity measurements 1000 may establish a projection of measurements for what may be ahead of drill bit 114 to form a "look ahead" measurement. A last measurement point 1004 is the most recent measurement point taken by logging tool 126. Measurements may only be taken after a pre-set amount of time and/or distance of travel has passed. Measurements taken may be increased by instructing logging tool 126 to take more measurements or slowing the distance traveled by logging tool 126 through formation 118. By slowing down the distance traveled by logging tool 126 a normal timeline or measurements taken by logging tool 126 may be closer together in space. Once a background EM field is established, noise recorded during measurement operations may be identified.

Referring back to FIG. 9, in block 906, noise within measurements taken during measurement operations may be identified. The background EM field may be used to identify noise within measurements taken. Noise in the background EM field may be identified as a random oscillation of data about a defined trend. A best fit line through the data may be determined. The noise may be a measurement of the deviation from the trend of the best fit line. Furthermore, the electronics noise acquired in the lab may be injected into the background EM field to evaluate the noise effect on the EM measurements.

In block 908, a continuous EM inversion may be performed with measurements taken by logging tool 126. The inversion may be performed at least in part on information handling system 134. As additional measurements are gathered, an inversion may be performed on this data as logging tool 126 moves through formation 118. The inversion may be performed in a 1D, 2D, 2.5D, and/or a 3D space to form, a one dimensional, two dimensional, two and half dimensional, or a third dimensional inversion. In examples, a second inversion could be run on the data that has been smoothed to remove the effect of noise. If the background EM field and noise are determined, this information may be applied to actual measurements to remove or minimize the spiky responses due to noise. Smoothing may be performed on the measurements before the measurements are inverted. In examples, smoothing operations may comprise low-pass filters, moving average, adaptive filtering to adjust the filter parameters based on the background EM filed and the noise, and/or the like. The final product may then be used to identify changes in geology of formation 118.

Figure 11:
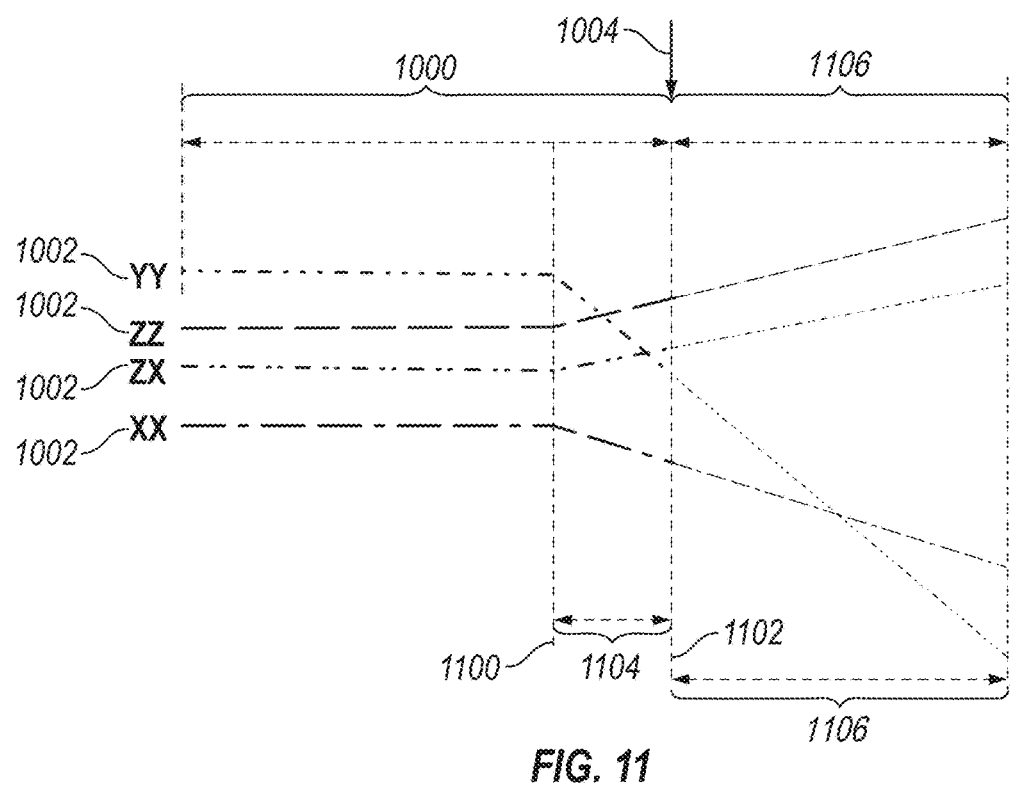
FIG. 11 illustrates a graph for identifying a change in components of a measured background electromagnetic field.

In block 910, changes to the background EM field may be identified. Automatically identifying any changes to the components from the background established in blocks 902-906 may be performed by analyzing changes to the gradient of the plotted component data using information handling system 134. In other examples, changes to the components from the background established in blocks 902-906 may be performed by a user that identifies an area where the components show an unexpected change in measurements. This would need to be within a defined window to account for noise in the measurements. FIG. 11 illustrates a graph for identifying a change in components from the background established in block 902-906 automatically by information handling system 134 or by a user.

The graph in FIG. 11 shows a continuation of resistivity measurements 1000 in orientation directions 1002 by logging tool 126 plotted in FIG. 10. As illustrated, last measurement point 1004 has moved from measurement location 1100 to second measurement location 1102. The area between measurement location 1100 and second measurement location 1102 may be identified as window 1104. Within window 1104 a gradient change may be calculated for each component 1002. The change in gradient for each component 1002 may be utilized to predict geology ahead of drill bit 114. This prediction may be based at least in part on the expected responses for each component 1002 if the gradient change continues. As illustrated in FIG. 11, future predicted gradient changes are illustrated in window 1106. Future gradient changes forecast expected resistivity measurements as RSS 136 moves forward within formation 118 during drilling operations.

Forecasting gradient changes may be performed by running an inversion on the predicted components to show what model this would generate. In examples, the model may be created by first generating a volume around borehole 116 (e.g., referring to FIG. 1) that has a constant conductivity value. A forward model that represents how logging tool 126 may respond in the conductivity environment around borehole 116 may be generated. This data is directly compared to the predicted data generated from the anticipated gradient changes. A misfit that represents the difference in the model prediction and the data generated from the anticipated gradient changes may be calculated to show the difference between each data set. An inversion then uses a gradient descent approach to gradually alter the conductivity around borehole 116 to decrease the misfit further. This cycle continues until the misfit falls below a misfit floor as defined in the inversion settings. This inversion may be performed at least in part on information handling system 134. Results from the inversion may allow for anticipation of the projected change in the position of resistivity bodies, identified by gradient changes of the resistivity measurements, ahead of drill bit 114, which may allow for earlier assessment of the change to the geology or fluids in formation 118 ahead of RSS 136.

Other forms of analysis may be performed to help identify geological or fluid change ahead of RSS 136. For example, utilizing NN 800, information handling system may run machine learning models to predict if a significant change in the resistivity ahead of RSS 136 may be suspected based at least in part on previous measurements taken and stored in NN 800. Operating NN 800, using systems and methods described above in tandem with inversion methods performed as described above, may indicate a change in trend of resistivity measurements away from what the geology is expected ahead of RSS 136. Generally, during measurement operations further projection of resistivity measurements may identify potential hazards ahead for RSS 136 as RSS 136 forms borehole 116 within formation 118.

If potential hazards may be identified as possible, measurement operations and/or drilling operations may be altered to verify potential hazards before altering the drill path of RSS 136 in drilling operations. For example, users at surface may instruct RSS 136 to enter into an enhanced look ahead mode for measurement operations. This is a communication sent from the surface to logging tool 126 using methods and systems described above. An enhanced look-ahead mode may also be set at the start of a drilling operation or programmed to start after a set time delay. Utilizing enhanced look ahead mode, bandwidth for EM data (e.g., resistivity measurements) may be optimized during measurement operations.

Optimization may comprise removing other Logging While Drilling Data that is also being streamed to surface, to increase EM data density and decrease the time this process may take. This will allow increased data density and transmission of additional frequencies beyond those transmitted during standard drilling operations. In other examples all available frequencies may be pulsed with fine data density along borehole 116 to create high data precision. Specifically, find data density may be measurements taken at the same depth range (drilling speed is same, but sending more data within the same timing with better real-time telemetry). This may also be referred to as higher data precision. For example, transmission of additional frequencies or increasing data density may require additional bandwidth but would result in improvements in the model inverted at surface. To allow for transmission of additional frequencies drilling operations may be slowed down and other parameters normally transmitted to surface are decreased or removed to increase the bandwidth available to measurements taken by logging tool 126. This in turn may allow for a more refined inversion to be conducted. As noted above, enhanced look ahead mode may also affect drilling operations. For example, stopping or slow drilling, which may allow for calibration of noise by taking multiple EM measurements while stationary or drilling ahead slowly. This may increase the number of measurements within a given distance may be much higher than in standard drilling operation mode. The increase in measurements may further allow for multiple measurements to identify the contribution of noise to the measured signal, either by averaging or statistical analysis. Which in turn may allow for removal of any identified noise from measurements to produce an enhanced cleaner signal in block 906.

By inverting the enhanced signal, in block 908, changes identified to the EM field may enhance identification of geology and fluids in formation 118. Other operations that enhanced look ahead mode may perform may be taking a longer averaging time, done downhole to speed process, fire more dedicated measurements to improve calibration and enhance the signal, and taking measurements whilst pumping mud through logging tool 126 and when not pumping. Enhancing the measurements in this way can also be used to improve the measured data when in standard drilling mode, by calibrating the contribution of noise to the signal for each frequency. These enhancements may help in projecting the gradient of the data ahead of drill bit 114 and invert to exaggerate any changes in geology or fluids ahead of drill bit 114.

Figure 12:
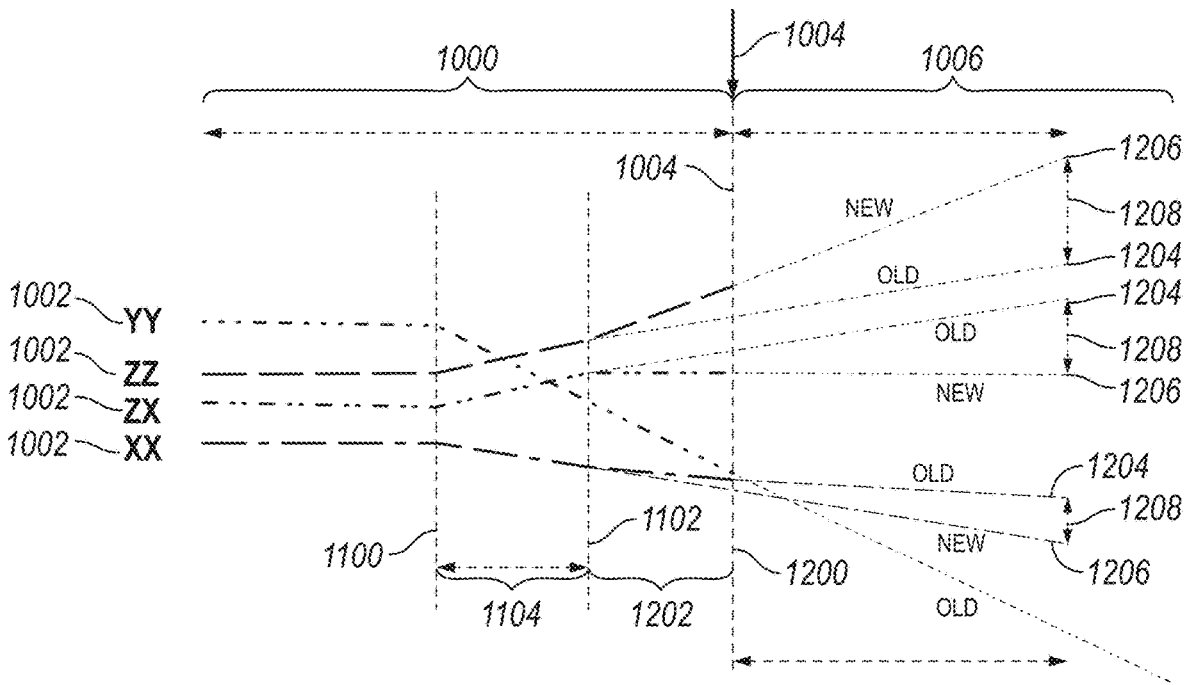
FIG. 12 is a graph illustrating the use of the workflow in FIG. 9.

Referring back to FIG. 9, in block 914, a determination of the direction of RSS 136 may travel may be identified. For example, as RSS 136 continues to move through formation 118 during drilling operations, new downhole measurements may be continuously made using the methods and systems described above, in regular or enhanced mode. Further prediction of geology or fluid ahead of drill bit 114 may be improved by decreasing uncertainty and the uncertainty measured by analyzing the difference in the original and new predictions. FIG. 12 illustrates a graph that shows a continuation or resistivity measurements 1000 of components 1002 from FIGS. 10 and 11. As illustrated, last measurement point 1004 has moved from second measurement location 1102 to a third measurement location 1200. Further illustrated is a second window 1202 in which a gradient change may be identified from second measurement location 1102 to third measurement location 1200. With continued reference to FIG. 12, gradient change from FIG. 11 for each component 1002 is identified as an "old prediction" 1204. The gradient change in second window 1202 creates a "new prediction" 1206 for each component 1002. The difference between old prediction 1204 and new prediction 1206 is an uncertainty 1208. Referring back to FIG. 9, workflow 900 may utilize loop 916 to obtain more measurements in block 908 to be taken during measurement operation. Loop 916 may allow for quality control of look ahead measurements. For example, further enhancement of the look ahead responses may be obtained through continued analysis of the data (e.g., performing methods and systems for blocks 910-914) for an entire drilling operation and applying the difference between what is predicted ahead, such as utilizing data from NN 800, and what is encountered to act as a quality control.

Figures 13A, 13B, 13C:
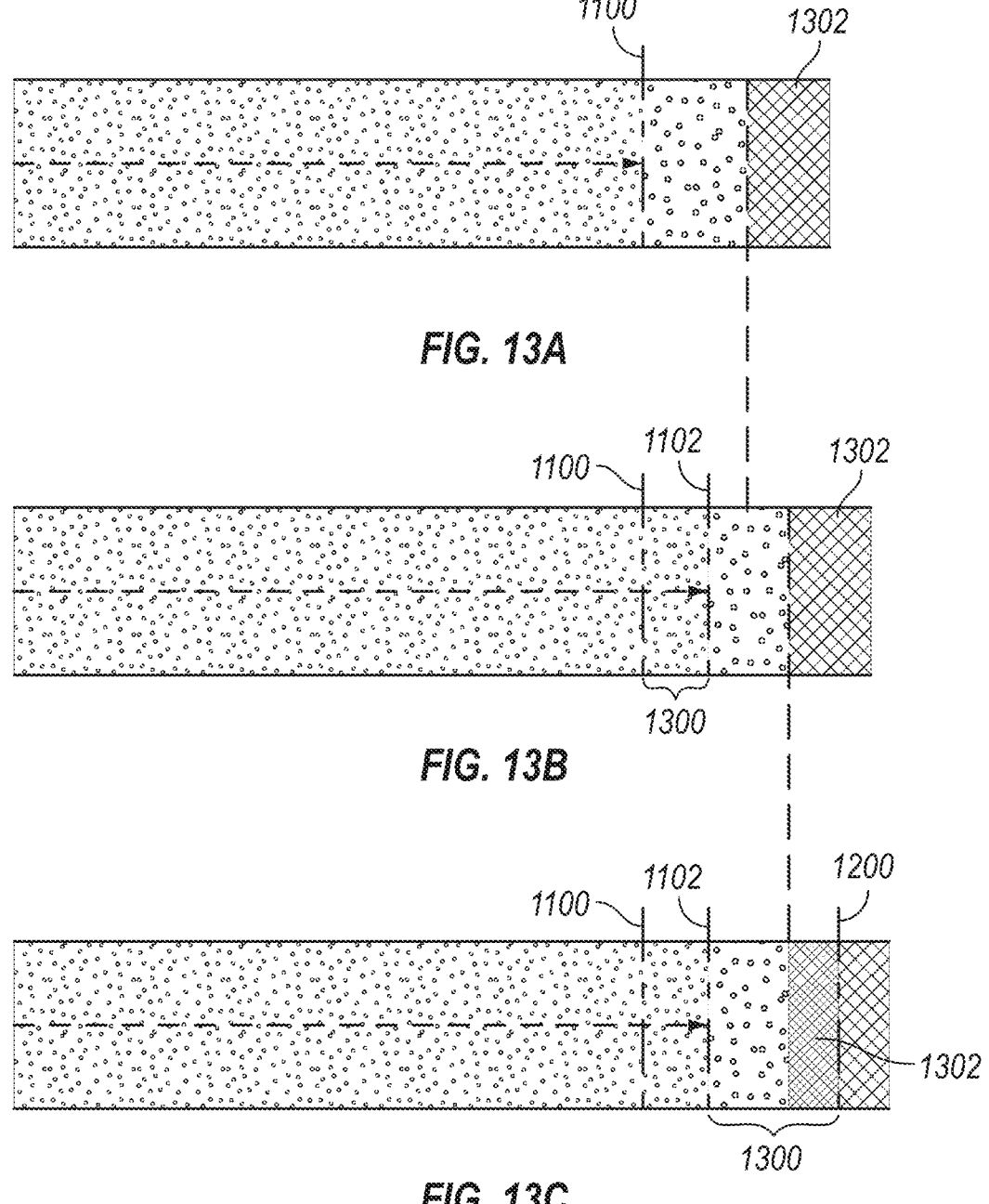
FIGS. 13A-13C are additional graphs illustrating the use of the workflow in FIG. 9.

As noted above, using NN 800 and/or information handling system 134, geological structures ahead of drill bit 114 may be predicted before measurements are taken by logging tool 126. With reference to FIGS. 13A-13C, predicting geological structures ahead of drill bit 114 (i.e., look ahead sensitivity) may act as a travelling window 1300 ahead of logging tool 126. When predicting geological structures, the gradient change discussed above may be utilized. Specifically, a predictive data set of one or more electromagnetic predictive responses for components 1002 may be formed from the gradient change and/or previously known information about the geological structures logging tool 126 may be disposed. In examples, the predictive response data set may be formed from extrapolation from the gradient change. Extrapolation may be performed by an extrapolation function such as a linear function, a polynomial function, and/or the like.

The predictive response data set may then be inverted using an inversion mathematical operation to form a predictive response inverted data set, such as the measured data sets discussed above. The predictive response inverted data sets may then be compared to inverted data sets from previous data sets, which may have been found in blocks 908 and 910.

Various methods may be used to compare differences or similarities between predictive response inverted data sets and previous data sets from measured data sets. In this context, the inverted data includes resistivity values at various locations within formation 118, which are located at different positions (X, Y, Z) relative to borehole 116. One approach may be to calculate the resistivity differences of the inverted data at the same location within formation 118, resulting in a new dataset highlighting distinctions and similarities. This makes it easier to identify locations within a formation 118 with similar resistivity values and those with differing resistivity values between the inverted data-sets. Other methods may involve clustering the inverted data or using machine learning (ML) or artificial intelligence (AI) techniques, such as NN 800 (e.g., referring to FIG. 8) to identify areas of similarity and distinction between two or more inverted datasets. Similarities and distinctions may be identified, for example, if logging tool 126 acquires 2 kHz 50 ft EM measurements along borehole 116. The predicted signal may also be at 2 kHz 50 ft data via modeling simulation. The difference may be at the 2 kHz 50 ft EM measurement difference. Generally, during measurement operations, there may be multi-spacing, multi-frequencies measurements acquired at the same location in borehole 116. Thus, the difference of each set of measurement may be compared. Some measurements (such as shallower spacing/higher frequency) may have smaller differences compared to other measurements (such as deeper spacing/lower frequency) because of the detection range difference from different set of frequency and transmitter-to-receiver spacing.

The comparison between predictive response inverted data set and the measured and inverted data sets may form a confident level in the predictive response inverted data set. A confident level is defined as the difference between the predictive response inverted data set and the previous inverted data sets from measured data sets. If the previous inverted data sets from measured data sets are similar to the predicted inverted data sets, specifically for the inverted data located ahead of drill bit 114 in formation 118 or far away from borehole 116, then a higher confident level is assigned that the first or the second, or both inverted data reveal good geological models at the identified locations within formation 118.

With continued reference to FIG. 13, as logging tool 126 moves forward through formation 118 and begins measuring the location in which a predictive data set was formed, then electromagnetic measurements of components 1002 (e.g., referring to FIG. 10) may be taken at the third location. Thes measurements may be referred to as "look around" measurements, which may be inverted, (e.g., blocks 904 & 906). In examples, predicted resistivity 1302 may be used if a pattern is identified, utilizing NN 800, to refine inversion of predictive data sets (i.e., look ahead measurements) for the rest of the well and refined/calibrated continuously as borehole 116 is formed in formation 118 by drilling operations. For example, geological structures seen previously in an individual well or in previous wells may be utilized in current predictive data measurements. As illustrated, the responses from logging tools 126 as these geological features are approached and intersected by logging tool 126 may show a distinctive pattern or development of that pattern that will help to refine future predictions when similar geological features are approached. The development of the initial predictions in previous examples may be used to refine the predicted model earlier.

As illustrated in FIG. 13, if the look ahead inversion reports a boundary further away or closer than mapped as it is crossed by logging tool 126 this distance uncertainty may be used to correct future look ahead inversions for distance to a boundary. For example, during extrapolation of the gradient change. If polynomial functions are utilized, the coefficient of the function may be updated when more data are received at the third location. This refinement/calibration may also be applied to the resistivity value reported to refine the results for resistivity values reported ahead.

Thus, utilizing loop 916 and continuously performing blocks 910-914 in workflow 900 during drilling operations, utilizing methods and systems described above, may reduce uncertainty. As more data becomes available the change ahead may be better resolved and an understanding of any potential uncertainty established to data available to a user to determine the direction in which to guide RSS 136.

The methods and systems described above are improvements over current technology. Specifically, identifying gradient variations of formations and features with the formation respective to logging tools. By identifying the gradient variations using models, then the formations and formation features may be predicted as to their location in front of logging tools during drilling operations.

Statement 1: A non-transitory machine-readable medium having data stored therein representing a software executable by a computer. The software executable comprising instructions configured to receive a first data set of one or more electromagnetic measurements at a first location in a borehole from a logging tool, receive a second data set of one or more electromagnetic measurements at a second location in the borehole from the logging tool, and perform a first inversion on the first data set of one or more electromagnetic measurements to form a first inverted data set. The instructions further configured to perform a second inversion on the second data set of one or more electromagnetic measurements to form a second inverted data set, compare the first inverted data set to the second inverted data set to identify a gradient change between each of the one or more electromagnetic measurements in the first inverted data set and the second inverted data set, and alter course of rotary steerable system (RSS) based at least in part on the gradient change.

Statement 2: The non-transitory machine-readable medium of statement 1, further configured to establish a background electromagnetic field from the first data set of one or more electromagnetic measurements.

Statement 3: The non-transitory machine-readable medium of statements 1 or 2, further configured to establish noise in the first data set of one or more electromagnetic measurements.

Statement 4: The non-transitory machine-readable medium of any previous statements 1-3, further configured to predict a geology of a formation from the gradient change.

Statement 5: The non-transitory machine-readable medium of any previous statements 1-4, wherein the first inversion and the second inversion is for a one dimensional, two dimensional, two and half dimensional, or a third dimensional inversion.

Statement 6: The non-transitory machine-readable medium of any previous statements 1-5, further configured to receive a third data set of one or more electromagnetic measurements at a third location in the borehole form the logging tool.

Statement 7: The non-transitory machine-readable medium of statement 6, further configured to perform a third inversion on the third data set of one or more electromagnetic measurements to form a third inverted data set.

Statement 8: The non-transitory machine-readable medium of statement 7, further configured to compare the third inverted data set to the second inverted data set to identify a second gradient change.

Statement 9: The non-transitory machine-readable medium of statement 8, further configured to compare the second gradient change to the gradient change to identify a difference between the gradient change and the second gradient change, wherein the difference is uncertainty.

Statement 10: The non-transitory machine-readable medium of statement 9, further configured to predict a geology of a formation based at least in part on the second gradient change and the uncertainty.

Statement 11: A non-transitory machine-readable medium having data stored therein representing a software executable by a computer. The software executable comprising instructions configured to receive a first data set of one or more electromagnetic measurements at a first location in a borehole of a formation from a logging tool, receive a second data set of one or more electromagnetic measurements at a second location in the borehole of the formation from the logging tool, perform a first inversion on the first data set of one or more electromagnetic measurements to form a first inverted data set, and perform a second inversion on the second data set of one or more electromagnetic measurements to form a second inverted data set. The instructions configured to compare the first inverted data set to the second inverted data set to identify a gradient change between each of the one or more electromagnetic measurements in the first inverted data set and the second inverted data set, form a predictive data set of one or more electromagnetic predictive responses for a third location in the formation based at least in part on the gradient change, perform a third inversion on the predictive data set of the one or more electromagnetic predictive responses to form a predictive response inverted data set, compare the predictive response inverted data set to the first inverted data or the second inverted data, or both to identify one or more distinctions or one or more similarities, estimate a confident level of the first inverted data or the second inverted data based on the one or more distinctions or the one or more similarities to the predictive response inverted data set, and alter course of rotary steerable system (RSS) based at least in part on the predictive response inverted data set.

Statement 12: The non-transitory machine-readable medium of statement 11, further configured to move the logging tool to the third location.

Statement 13: The non-transitory machine-readable medium of statement 12, further configured to receive a third data set of one or more electromagnetic measurements at the third location.

Statement 14: The non-transitory machine-readable medium of statement 13, further configured to compare the third data set to the predictive data set to identify if a difference exists between the one or more electromagnetic measurements and the one or more electromagnetic predictive responses.

Statement 15: A non-transitory machine-readable medium having data stored therein representing a software executable by a computer. The software executable comprising instructions configured to receive a first data set of one or more electromagnetic measurements at a first location in a borehole in a formation from a logging tool, receive a second data set of one or more electromagnetic measurements at a second location in the borehole in the formation from the logging tool, perform a first inversion on the first data set of one or more electromagnetic measurements to form a first inverted data set, perform a second inversion on the second data set of one or more electromagnetic measurements to form a second inverted data set, and compare the first inverted data set to the second inverted data set to identify a gradient change between each of the one or more electromagnetic measurements in the first inverted data set and the second inverted data set. The instructions further configured extrapolate from the gradient change to form one or more predictive responses for a third location in the formation based on the gradient change from the first data set and the second data set, extrapolate for one or more predictive responses at the third location using an extrapolation function on the gradient change for each of the one or more electromagnetic measurements, perform a third inversion on the one or more predictive responses for each of the one or more electromagnetic measurements to form a predictive response inverted data set, compare the predictive response inverted data set to the first data set of one or more electromagnetic measurements and the second data set of the one or more electromagnetic measurements to identify one or more distinctions or one or more similarities, estimate a confident level of the first data set of one or more electromagnetic measurements and the second data set of one or more electromagnetic measurements based on the one or more distinctions or the one or more similarities to the predictive response inverted data set, and alter course of rotary steerable system (RSS) based at least in part on the one or more predictive responses.

Statement 16. The non-transitory machine-readable medium of statement 15, further configured to move the logging tool to the third location.

Statement 17: The non-transitory machine-readable medium of statement 16, further configured to receive a third data set of one or more electromagnetic measurements at the third location.

Statement 18: The non-transitory machine-readable medium of statement 17, further configured to compare the one or more electromagnetic measurements to the one or more predictive responses to identify if a difference exists between the one or more electromagnetic measurements and the one or more predictive responses.

Statement 19: The non-transitory machine-readable medium of statement 18, further configured to update the extrapolation function based at least in part on the difference.

Statement 29: The non-transitory machine-readable medium of any previous statements 15 or 16, further configured to establish a background electromagnetic field from the first data set of one or more electromagnetic measurements.

The preceding description provides various examples of the wellbore tools and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

What is claimed is:

1. A non-transitory machine-readable medium having data stored therein representing a software executable by a computer, the software executable comprising instructions configured to:

receive a first data set of one or more electromagnetic measurements at a first location in a borehole from a logging tool;

receive a second data set of one or more electromagnetic measurements at a second location in the borehole from the logging tool;

perform a first inversion on the first data set of one or more electromagnetic measurements to form a first inverted data set;

perform a second inversion on the second data set of one or more electromagnetic measurements to form a second inverted data set;

compare the first inverted data set to the second inverted data set to identify a gradient change between each of the one or more electromagnetic measurements in the first inverted data set and the second inverted data set;

receive a third data set of one or more electromagnetic measurements at a third location in the borehole from the logging tool;

perform a third inversion on the third data set of one or more electromagnetic measurements to form a third inverted data set;

compare the third inverted data set to the second inverted data set to identify a second gradient change;

compare the second gradient change to the gradient change to identify a difference between the gradient change and the second gradient change, wherein the difference is uncertainty; and alter course of the logging tool based at least in part on the gradient change.

2. The non-transitory machine-readable medium of claim 1, further configured to establish a background electromagnetic field from the first data set of one or more electromagnetic measurements.

3. The non-transitory machine-readable medium of claim 1, further configured to establish noise in the first data set of one or more electromagnetic measurements.

4. The non-transitory machine-readable medium of claim 1, further configured to predict a geology of a formation from the gradient change.

5. The non-transitory machine-readable medium of claim 1, wherein the first inversion and the second inversion is for a one dimensional, two dimensional, two and half dimensional, or a third dimensional inversion.

6. The non-transitory machine-readable medium of claim 1, further configured to predict a geology of a formation based at least in part on the second gradient change and the uncertainty.

7. A non-transitory machine-readable medium having data stored therein representing a software executable by a computer, the software executable comprising instructions configured to:

receive a first data set of one or more electromagnetic measurements at a first location in a borehole of a formation from a logging tool;

receive a second data set of one or more electromagnetic measurements at a second location in the borehole of the formation from the logging tool;

perform a first inversion on the first data set of one or more electromagnetic measurements to form a first inverted data set;

perform a second inversion on the second data set of one or more electromagnetic measurements to form a second inverted data set;

compare the first inverted data set to the second inverted data set to identify a gradient change between each of the one or more electromagnetic measurements in the first inverted data set and the second inverted data set;

form a predictive data set of one or more electromagnetic predictive responses for a third location in the formation based at least in part on the gradient change;

perform a third inversion on the predictive data set of the one or more electromagnetic predictive responses to form a predictive response inverted data set;

compare the predictive response inverted data set to the first inverted data or the second inverted data, or both to identify one or more distinctions or one or more similarities;

estimate a confident level of the first inverted data or the second inverted data based on the one or more distinctions or the one or more similarities to the predictive response inverted data set; and alter course of the logging tool based at least in part on the predictive response inverted data set.

8. The non-transitory machine-readable medium of claim 7, further configured to move the logging tool to the third location.

9. The non-transitory machine-readable medium of claim 8, further configured to receive a third data set of one or more electromagnetic measurements at the third location.

10. The non-transitory machine-readable medium of claim 9, further configured to compare the third data set to the predictive data set to identify if a difference exists between the one or more electromagnetic measurements and the one or more electromagnetic predictive responses.

11. A non-transitory machine-readable medium having data stored therein representing a software executable by a computer, the software executable comprising instructions configured to:

receive a first data set of one or more electromagnetic measurements at a first location in a borehole in a formation from a logging tool;

receive a second data set of one or more electromagnetic measurements at a second location in the borehole in the formation from the logging tool;

perform a first inversion on the first data set of one or more electromagnetic measurements to form a first inverted data set;

perform a second inversion on the second data set of one or more electromagnetic measurements to form a second inverted data set;

compare the first inverted data set to the second inverted data set to identify a gradient change between each of the one or more electromagnetic measurements in the first inverted data set and the second inverted data set;

extrapolate from the gradient change to form one or more predictive responses for a third location in the formation based on the gradient change from the first data set and the second data set;

extrapolate for one or more predictive responses at the third location using an extrapolation function on the gradient change for each of the one or more electromagnetic measurements;

perform a third inversion on the one or more predictive responses for each of the one or more electromagnetic measurements to form a predictive response inverted data set;

compare the predictive response inverted data set to the first data set of one or more electromagnetic measurements and the second data set of the one or more electromagnetic measurements to identify one or more distinctions or one or more similarities;

estimate a confident level of the first data set of one or more electromagnetic measurements and the second data set of one or more electromagnetic measurements based on the one or more distinctions or the one or more similarities to the predictive response inverted data set; and alter course of the logging tool based at least in part on the one or more predictive responses.

12. The non-transitory machine-readable medium of claim 11, further configured to move the logging tool to the third location.

13. The non-transitory machine-readable medium of claim 12, further configured to receive a third data set of one or more electromagnetic measurements at the third location.

14. The non-transitory machine-readable medium of claim 13, further configured to compare the one or more electromagnetic measurements to the one or more predictive responses to identify if a difference exists between the one or more electromagnetic measurements and the one or more predictive responses.

15. The non-transitory machine-readable medium of claim 14, further configured to update the extrapolation function based at least in part on the difference.

16. The non-transitory machine-readable medium of claim 11, further configured to establish a background electromagnetic field from the first data set of one or more electromagnetic measurements.

* * * * *